US006781993B1

(12) United States Patent
Takechi et al.

(10) Patent No.: US 6,781,993 B1
(45) Date of Patent: Aug. 24, 2004

(54) SWITCH AND SWITCHING METHOD FOR PROCESSING COMMUNICATION DATA OF A PARTICULAR CONNECTION

(75) Inventors: Ryuichi Takechi, Kanagawa (JP); Tsuguo Kato, Kanagawa (JP); Hideaki Ono, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/325,144

(22) Filed: Jun. 3, 1999

(30) Foreign Application Priority Data

Jul. 24, 1998 (JP) .......................................... 10-208787

(51) Int. Cl.[7] .............................................. H04L 12/56
(52) U.S. Cl. .................................... 370/395.1; 370/389
(58) Field of Search ............................ 370/388, 395.1, 370/353, 354, 352, 465, 398

(56) References Cited

U.S. PATENT DOCUMENTS

| 4,058,838 A | | 11/1977 | Crager et al. |
| 4,291,200 A | * | 9/1981 | Smith |
| 4,692,917 A | | 9/1987 | Fujioka |
| 4,707,853 A | * | 11/1987 | Hasegawa ................... 379/221 |
| 4,769,815 A | | 9/1988 | Hinch et al. |
| 4,956,839 A | | 9/1990 | Torii et al. |

(List continued on next page.)

FOREIGN PATENT DOCUMENTS

| CA | 2002729 | 5/1990 |
| JP | 63-74346 | 4/1988 |
| JP | 03-132123 | 6/1991 |
| JP | 3-175839 | 7/1991 |
| JP | 05-110582 | 4/1993 |
| JP | 5-191436 | 7/1993 |
| JP | 5-227221 | 9/1993 |
| JP | 06-232911 | 8/1994 |
| JP | 07-131461 | 5/1995 |
| JP | 07-202892 | 8/1995 |
| JP | 09-284288 | 10/1997 |
| JP | 10-056456 | 2/1998 |

OTHER PUBLICATIONS

Kawasaki, et al., "A Study on Routing Strategy for Connectionless Communications Using ATM Networks" 1991 Spring National Convention Record, The Institute of Electronics, Information and Communication Engineers Mar. 26–29, 1991, B–498.

Byrne, et al., "Evolution of Metropolitan Area Networks to Broadband ISDN" IEEE Communication Magazine, vol. 29, No. 1; pp. 78–82, Jan. 1991.

*Primary Examiner*—Kenneth Vanderpuye
(74) *Attorney, Agent, or Firm*—Katten Muchin Zavis Rosenman

(57) ABSTRACT

Data from an STM (Synchronous Transfer Mode) network is converted into an ATM (Asynchronous Transfer Mode) cell by an interworking facility, and the ATM cell is input to the ATM network. If the input cell corresponds to a connection which requires voice processing, a voice processing trunk within a switch performs the processes such as an echo compensation process, an encoding process, a multiplexing process, etc. The switch outputs the cell to a trunk line of the ATM network.

23 Claims, 30 Drawing Sheets

U.S. PATENT DOCUMENTS

| | | |
|---|---|---|
| 5,050,166 A | 9/1991 | Cantoni et al. |
| 5,062,106 A | 10/1991 | Yamazaki et al. |
| 5,067,123 A | 11/1991 | Hyodo et al. |
| 5,101,404 A | 3/1992 | Kunimoto et al. |
| 5,113,392 A | 5/1992 | Takiyasu et al. |
| 5,119,369 A | 6/1992 | Tanabe et al. |
| 5,119,370 A | 6/1992 | Terry |
| 5,163,045 A | 11/1992 | Caram et al. |
| 5,202,885 A | 4/1993 | Schrodi et al. |
| 5,214,648 A | 5/1993 | Lespagnol et al. |
| 5,229,991 A | 7/1993 | Turner |
| 5,265,091 A | 11/1993 | van Landegem |
| 5,280,476 A | 1/1994 | Kojima et al. |
| 5,359,600 A * | 10/1994 | Ueda et al. |
| 5,436,894 A * | 7/1995 | Wallmeir et al. |
| 5,457,684 A * | 10/1995 | Bharucha |
| 5,487,102 A * | 1/1996 | Rothschild et al. ............ 379/67 |
| 5,903,573 A * | 5/1999 | Wolf .......................... 370/535 |
| 6,163,535 A * | 12/2000 | Jordan et al. ................ 370/352 |
| 6,377,675 B1 * | 4/2002 | Rabourn et al. ............ 379/230 |
| 6,411,620 B1 | 6/2002 | Takase et al. |

* cited by examiner

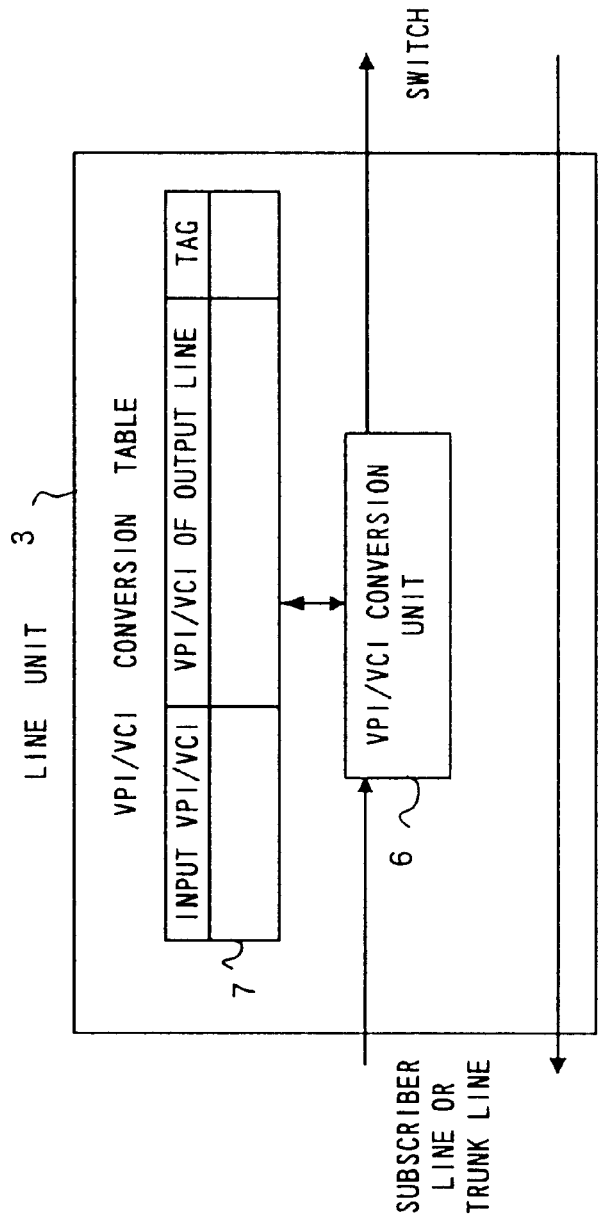
F I G. 1 B

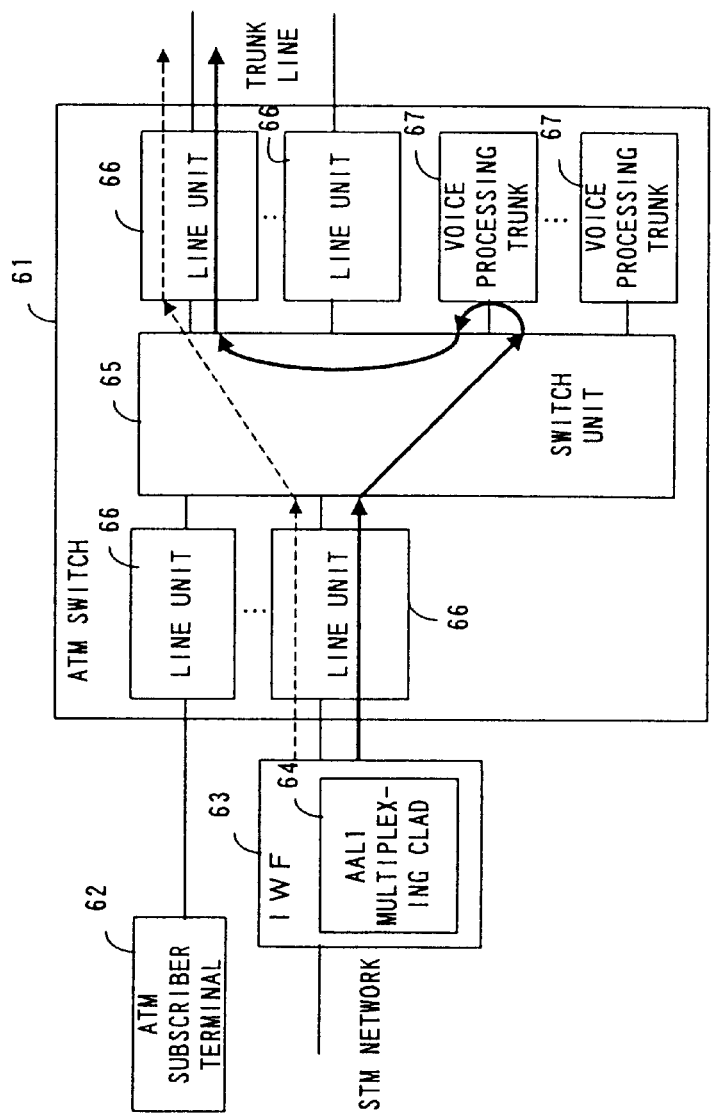
F I G. 3

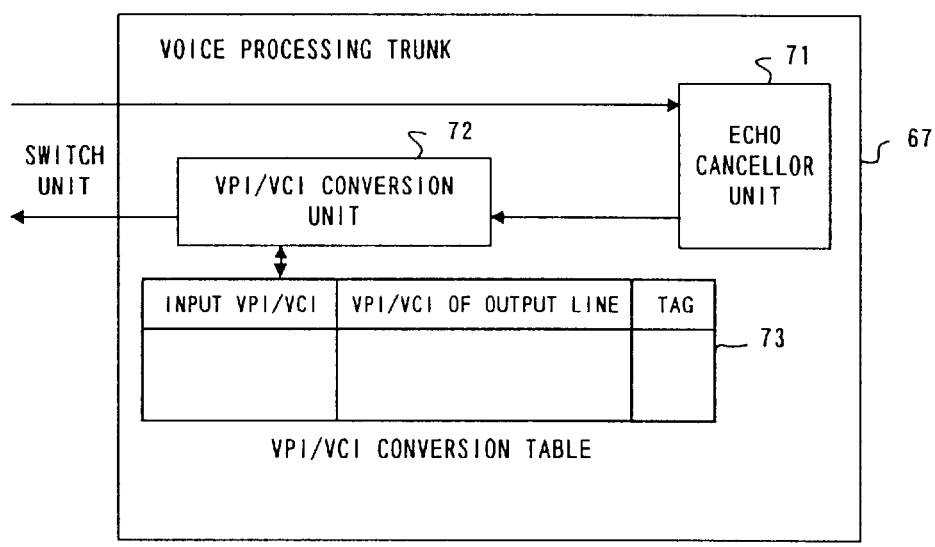
F I G. 4

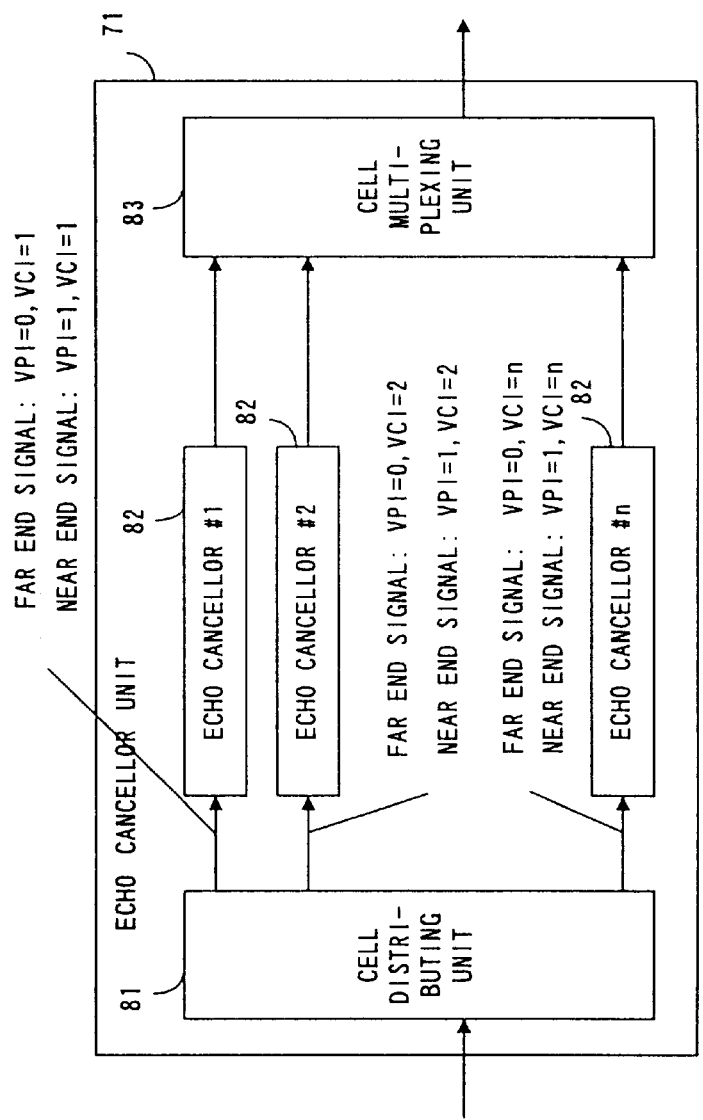
F I G. 7

| INPUT VPI/VCI | OUTPUT VPI | OUTPUT VCI | TAG | CORRESPONDING CONNECTION |
|---|---|---|---|---|
| VALUE AT POINT A | 1 | 1 | c | NEAR END SIGNAL OF ECHO CANCELLOR #1 |
| VALUE AT POINT A | 1 | 2 | c | NEAR END SIGNAL OF ECHO CANCELLOR #2 |
| .. | .. | .. | .. | .. |
| VALUE AT POINT A | 1 | n | c | NEAR END SIGNAL OF ECHO CANCELLOR #n |
| VALUE AT POINT A | VALUE AT POINT B | VALUE AT POINT B | b | CONNECTION NOT VIA ECHO CANCELLOR (NON-VOICE DATA, ETC.) |
| | | | | |
| | | | | |

F I G. 8

| INPUT VPI/VCI | OUTPUT VPI | OUTPUT VCI | TAG | CORRESPONDING CONNECTION |
|---|---|---|---|---|
| VALUE AT POINT B | 0 | 1 | c | FAR END SIGNAL OF ECHO CANCELLOR #1 |
| VALUE AT POINT B | 0 | 2 | c | FAR END SIGNAL OF ECHO CANCELLOR #2 |
| ... | ... | ... | ... | ... |
| VALUE AT POINT B | 0 | n | c | FAR END SIGNAL OF ECHO CANCELLOR #n |
| VALUE AT POINT B | VALUE AT POINT A | VALUE AT POINT A | a | CONNECTION NOT VIA ECHO CANCELLOR (NON-VOICE DATA, ETC.) |
| | | | | |

F I G. 9

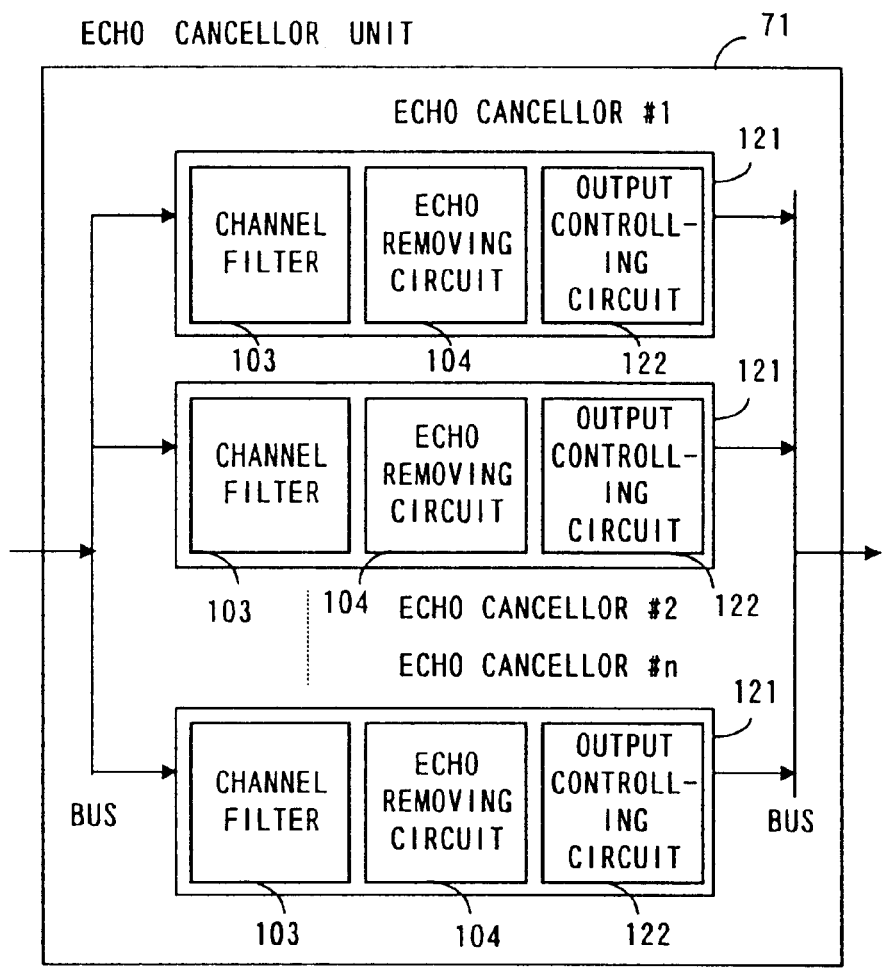
F I G. 1 3

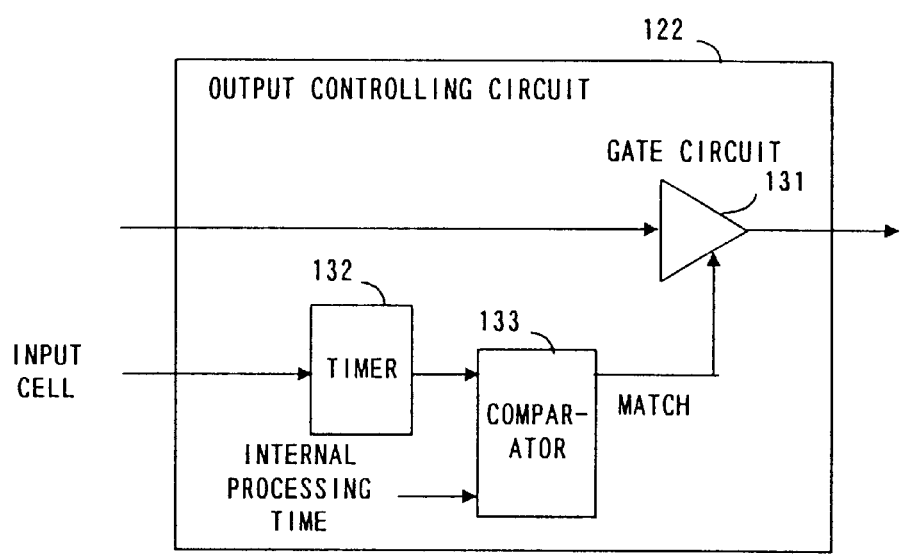
F I G. 1 4

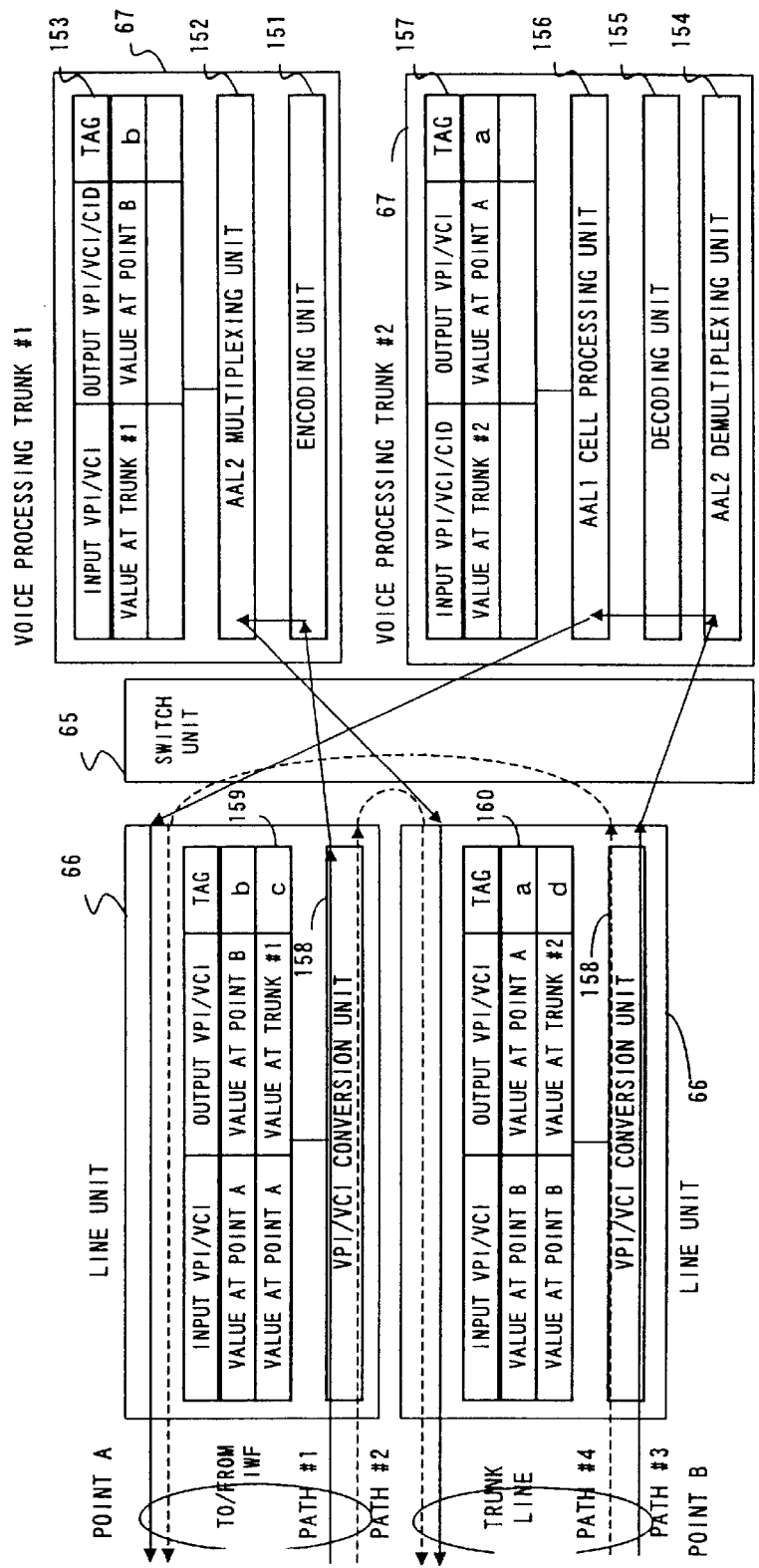
F I G. 17

SWITCH AND SWITCHING METHOD FOR PROCESSING COMMUNICATION DATA OF A PARTICULAR CONNECTION

BACKGROUND OF THE INVENTION

1. Field of the Invention

The present invention relates to a switch and a switching method for performing a switching operation for each cell and a process for accommodating various types of data accommodated within a different network in a communications network where data is partitioned into cells being fixed-length packets, which are transferred.

2. Description of the Related Art

An ATM (Asynchronous Transfer Mode) communications method is a method for partitioning data having various speeds into fixed-length packets referred to as cells, and for transferring the cells. This method can process various types of data having diversified traffic characteristics in a unified manner in a communications network. Therefore, a communications network adopting the ATM communication method (ATM network) has been built as the infrastructure of multimedia communications.

ATM switches are arranged in such an ATM network, and relay ATM connections between users by performing a switching operation for each cell. For example, the ATM switch disclosed by the Japanese Laid-open Patent Application No. 7-307745 has the configuration shown in FIG. 1A.

An ATM switch 1 shown in FIG. 1A is mainly composed of a switch unit 2 and a plurality of line units 3 (subscriber line units or trunk line units). One or a plurality of subscriber terminals 5 are connected to each of the line units 3 directly or via a transmitting device 4, and one or a plurality of connections (ATM connections) from one or a plurality of subscribers are accommodated by each of the line units 3.

As described above, the ATM switch 1 can accommodate a plurality of connections on a single input port (line unit). To which connection a cell belongs is identified with a VPI (Virtual Path Identifier) and a VCI (Virtual Channel Identifier), which are included in the header of the cell. A connection identified only with the VPI is referred to as a VP connection, while a connection identified with the VPI and the VCI is referred to as a VC connection.

When a connection is relayed by the ATM switch 1, a VPI/VCI conversion unit 6 arranged within the line unit 3 converts the VPI/VCI of an input cell into those corresponding to an output line, and attaches tag information (TAG) to the cell by referencing a VPI/VCI conversion table 7, as shown in FIG. 1B. The TAG is an internal identifier used for selecting a route within the switch unit 2.

The switch unit 2 outputs a cell to a desired route by using the TAG attached to the cell. With these operations, the ATM switch 1 can switch each of input cells to a desired line.

By the way, an ATM network can accommodate subscriber terminals other than ATM terminals. As such terminals, for example, terminals connected to an existing STM (Synchronous Transfer Mode) communications network which mainly handles telephony services can be cited.

If an STM subscriber terminal is accommodated by an ATM network, an STM-ATM converter called an IWF (InterWorking Facility) or a CLAD (Cell Assembly and Disassembly) is installed between the STM and ATM networks. The STM-ATM converter converts STM data into an ATM cell, and transfers the STM data within the ATM network.

FIG. 1C is a block diagram showing the network configuration where an ATM network accommodates an existing STM network. In this figure, an ATM network 11 includes a plurality of ATM switches 1, to each of which an ATM subscriber terminal 5 is connected. An STM network 12 includes a plurality of STM switches 13, to each of which an STM subscriber terminal 14 is connected. IWFs 15 are arranged between the ATM switches 1 and the STM switches 13.

For example, data transmitted from the STM subscriber terminal 14 in the lower left of this figure is input to the ATM network 11 via the STM switch 13 and the IWF 15, and is transferred over a trunk line within the ATM network 11. Then, the data reaches the STM subscriber terminal 14 in the lower right via the IWF 15 and the STM switch 13. Or, the data may sometimes reach the ATM subscriber terminal 5 in the upper right, which is connected to the ATM network 11.

In this case, the following two methods can be considered as a data mapping method used when STM data is converted into ATM cells (hereinafter referred to as cell processing) or ATM cells are converted into STM data (hereinafter referred to as decell processing) within the IWF 15.

(a) A method using an AAL (ATM Adaptation Layer) type 1 (ITU-T (International Telecommunications Union-Telecommunications) Recommendation I.36.3.1)

(b) A method using an AAL type 2 (ITU-T Recommendation I.363.2)

The AAL type 1 is also referred to as an AAL1. This is a cell processing method for transmitting STM data of 47 bytes, each of which has a 125-$\mu$s speed, is transmitted as one cell. This method is suitable for the case where the cell processing is performed for data at a fixed-rate speed. Additionally, an AAL type 2 is also referred to as an AAL2. This is a cell processing method for mapping data onto short packets of a variable length, which are referred to as short cells, and for multiplexing a plurality of short cells into a single ATM cell. This method is suitable for the case where the cell processing is performed for data of variable and low-speed data.

When the IWF 15 performs the cell processing for STM data, it reduces the amount of the data by performing voice encoding (including silence suppression as occasion demands), and performs the cell processing for the encoded data with the AAL type 2. The silence suppression means that data is not transferred if it is in an unvoiced state.

Such cell processing allows the bandwidth compression of data in an ATM network. Note that, however, the bandwidth compression is implemented based on the assumption that the IWF 15 or the ATM subscriber terminal 5, which is the destination of a connection, supports the AAL type 2. For a non-voice signal for which the bandwidth compression cannot be performed, a transfer with the AAL type 1 is more useful than that with the AAL type 2 in terms of a bandwidth.

The above described conventional communications methods, however, have the following problems.

Normally, if a transmission delay exceeds 25 ms on either of calling and called sides at the time of a voice signal transfer, an echo caused by this delay cannot be ignored and the echo must be compensated for by an echo canceller. When STM data is transferred within an ATM network, a delay specific to the ATM network and a delay which accompanies the cell or decell processing performed by the IWF occur. Therefore, a delay time may be larger than that in an existing STM network.

FIG. 1D is a schematic diagram showing a delay which accompanies the cell/decell processing performed by the IWF with the use of the AAL type 1. When the IWF generates a single ATM cell 22 by performing the cell processing for 47-byte STM data 21, a cell processing delay depending on each of the bytes occurs. By way of example, a cell processing delay of approximately 6 ms (125 $\mu$s×47) occurs for the leftmost 1-byte data 21', while a cell processing delay is recognized to be "0" for the rightmost 1-byte data 21".

When the ATM cell 22 is transferred over an ATM network, a transmission line delay and a delay variation absorption time $\tau$ within the ATM network are added. Normally, cells are buffered in order to prevent a loss caused by a cell conflict within the ATM network. The delay variation absorption time $\tau$ is required to absorb the delay variations of cells caused by the buffering.

Furthermore, when the STM data 21 is regenerated by performing the decell processing for the ATM cell 22 by the IWF at a transfer destination, a decell processing delay occurs depending on each of the bytes. By way of example, a decell processing delay is recognized to be "0" for the data 21', while a decell processing delay of approximately 6 ms occurs for the data 21".

Accordingly, a delay accompanying the cell/decell processing can be estimated to be approximately 6 ms, and the total delay time can be calculated by adding the transmission line delay and the delay variation absorption time $\tau$ to the cell/decell processing delay. Occurrences of the cell/decell processing delay and the delay variation absorption time mean that an area in which an echo must be compensated for increases for an STM subscriber receiving an existing analog telephone service.

If the capability provided by an IWF is the cell/decell processing of the AAL type 1, a CLAD of the AAL type 1 must be arranged within the IWF. Also an echo cancellor must be arranged to compensate for the above described echo caused by a cell delay.

FIG. 1E is a block diagram showing the configuration of a hypothetical IWF equipped with the above described devices. An IWF 31 shown in FIG. 1E accommodates "m" channels, and comprises echo cancellors 33 the number of which is equal to the number of channels, and an AAL1 multiplexing CLAD 32. The AAL1, multiplexing CLAD 32 comprises AAL1-CLADs 34 the number of which is equal to the number of channels, and an ATM demultiplexing unit 35. Here, the AAL1-CLADs 34 are arranged for the respective channels. However, a multiplexing CLAD for processing a plurality of channels altogether was developed (for example, the Japanese Laid-open Patent Application No. 5-37548).

If the capability provided by the IWF is cell/decell processing of the AAL type 2, a CLAD of the AAL type 2 must be arranged within the IWF. Also an echo cancellor is required due to a reason similar to that for the AAL1 type.

FIG. 1F is a block diagram showing the configuration of a hypothetical IWF equipped with these devices. An IWF 41 shown in this figure accommodates m channels, and comprises echo cancellors 42 and voice encoders 43, the numbers of which are equal to the number of channels, and an AAL2-CLAD 44.

Normally, signals of a plurality of channels are multiplexed at an input/output point on an STM network side of an IWF in many cases. Each of the channels accommodates various types of data such as an analog voice, bearer data, etc. The bearer data indicates, for example, data transferred by a bearer service with the use of a dedicated line, and is not limited to voice data.

As described above, an optimum AAL type differs depending on the type of data. Therefore, it is desirable to change the AAL type depending on the type of data in order to make efficient use of an ATM network.

For example, if a connection destination accommodates the AAL type 2 at the time of an analog voice transfer, it is desirable to perform the cell processing of the AAL type 2. If the connection destination does not accommodate the AAL type 2, it is desirable to perform the cell processing of the AAL type 1. When non-voice data is transferred, it is desirable to perform the cell processing of the AAL type 1. For an analog voice, an echo cancellor must be installed depending on an amount of an end-to-end transmission delay time.

However, if the IWF is designed to provide both of the capabilities of the AAL types 1 and 2, and to provide the capability of an echo cancellor depending on a connection, the configurations shown in FIGS. 1E and 1F must be combined. In this case, echo cancellors, voice encoders, etc. must be arranged for all of channels accommodated by the IWF, so that an amount of equipment becomes very large.

Especially, digital signal processing using a DSP (Digital Signal Processor), etc. must be performed within each echo cancellor and a voice encoder. Accordingly, their hardware sizes are significantly large. If echo cancellors and voice encoders for all the channels are arranged, the total size of the IWF becomes extraordinary.

Furthermore, if encoding algorithms of voice encoders are different depending on IWFs such as an IWF at a connection destination, etc., a plurality of voice encoders or a voice encoder accommodating a plurality of encoding algorithms must be arranged for each channel.

SUMMARY OF THE INVENTION

An object of the present invention is to provide a switch and a switching method for efficiently accommodating various types of data accommodated within a different communications network such as an STM network, etc., and for reducing an amount of equipment of interworking facilities between networks in a communications system such as an ATM network, etc., which partitions data into fixed-length packets and transfers the packets.

In a first aspect of the present invention, a switch comprises a switch unit and a trunk unit, and switches communication data, which is partitioned into cells being fixed-length packets, for each of the cells. The switch unit determines an output route for each input cell. The trunk unit performs voice processing for an input cell if the cell belongs to a particular voice connection.

The switch unit performs a switching operation, for example, based on the VPI/VCI being the connection identification information of an input cell, and determines an output route according to a connection. If the input cell is identified to belong to a particular voice connection at this time, the switch unit outputs this cell to the trunk unit.

The trunk unit performs one of an echo cancellor process for removing an echo of a far end signal superposed on a near end signal, an encoding process for converting voice data of an input cell into a particular voice code, a decoding process for converting a voice code of an input cell into voice data, a multiplexing process for multiplexing data of an input cell into an AAL type 2 cell, a demultiplexing process for demultiplexing data from an AAL type 2 cell, etc. and again inputs the cell to the switch unit.

In a second aspect of the present invention, a trunk is arranged for a system which switches communication data, which is partitioned into cells being fixed-length packets, for each of the cells, and comprises a voice processing unit and a conversion unit. The voice processing unit performs voice processing for an input cell if the cell belongs to a particular voice connection. The conversion unit converts the connection identification information of that cell.

In a third aspect of the present invention, an switch comprises a switch unit and a trunk unit, and switches communication data, which is partitioned into cells being fixed-length packets, for each of the cells. The switch unit determines an output route for each input cell. The trunk unit processes data of an input cell if the cell belongs to a particular connection.

BRIEF DESCRIPTION OF THE DRAWINGS

FIG. 1B shows the configuration of a line unit;

FIG. 3 shows a first switching method;

FIG. 4 is a block diagram showing the configuration of a first voice processing trunk;

FIG. 7 shows the configuration of a first echo cancellor unit;

FIG. 8 shows the structure of a first VPI/VCI conversion table;

FIG. 9 shows the structure of a second VPI/VCI conversion table;

FIG. 13 shows the configuration of a third echo cancellor unit;

FIG. 14 shows the configuration of an output controlling circuit;

FIG. 17 shows a fourth switching method;

DESCRIPTION OF THE PREFERRED EMBODIMENTS

Figure 1A:
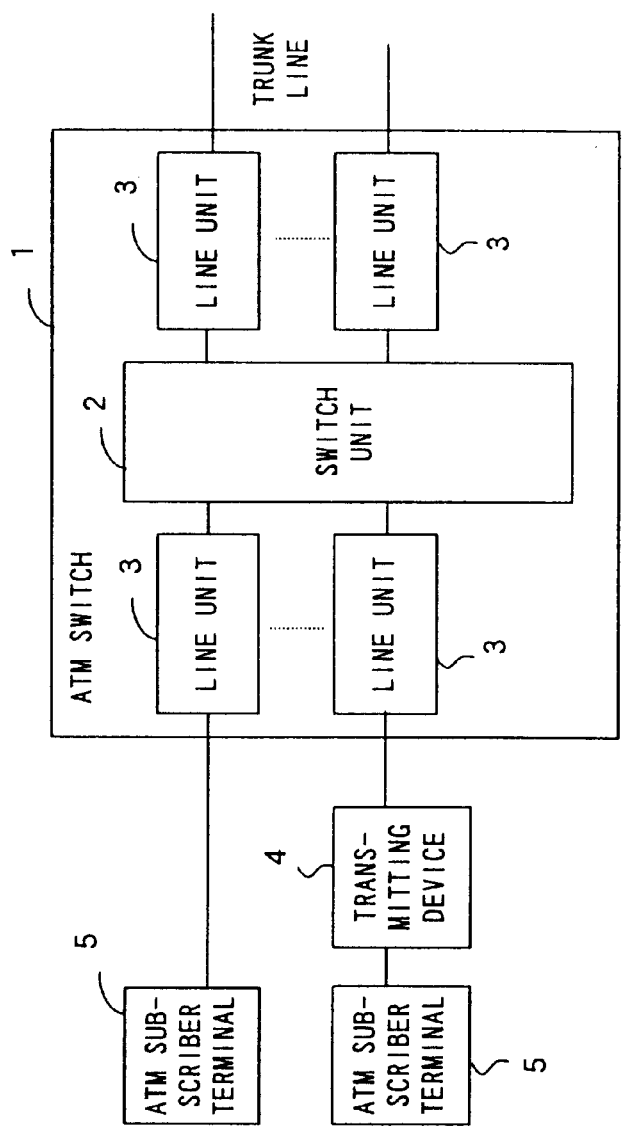
FIG. 1A is a block diagram showing the configuration of a conventional ATM switch.
Figure 1C:
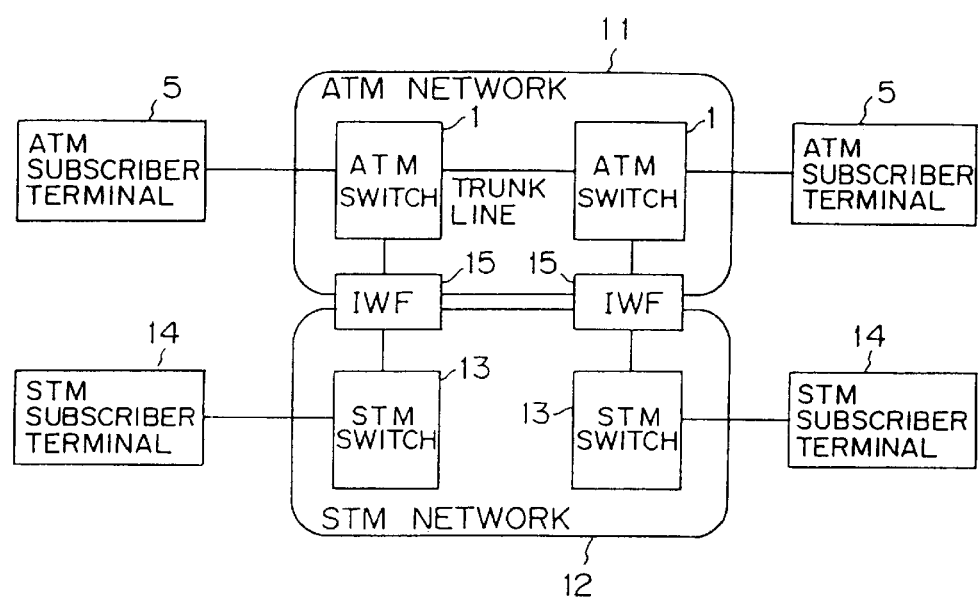
FIG. 1C is a block diagram showing the network configuration where an ATM network accommodates an STM network.
Figure 1D:
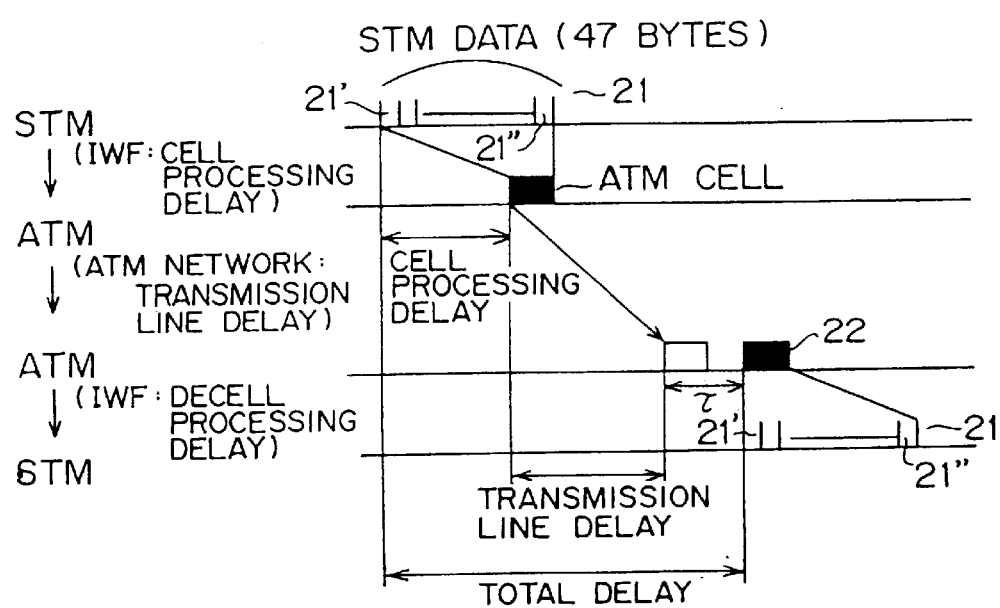
FIG. 1D is a schematic diagram showing a processing delay caused by an IWF.

Provided below is the explanation about the details of preferred embodiments, by referring to the drawings.

Figure 2A:
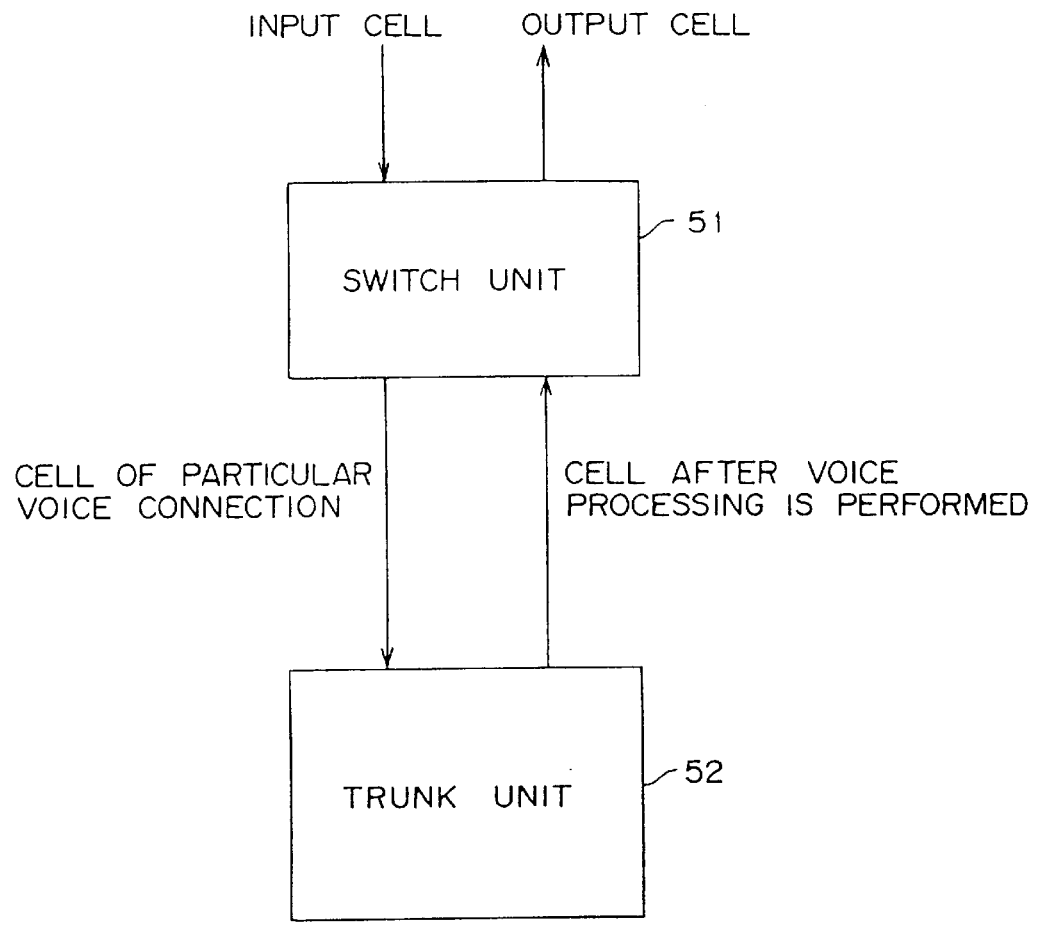
FIG. 2A is a block diagram showing the principle of a switch according to the present invention.

FIG. 2A is a block diagram showing the principle of a switch according to the present invention. The switch shown in this figure is, for example, an ATM switch, and switches communication data, which is partitioned into cells being fixed-length packets, for each of the cells. This switch comprises a switch unit 51 and a trunk unit 52. The switch unit 51 determines an output route for each input cell. The trunk unit 52 performs voice processing for an input cell if the cell belongs to a particular voice connection.

The switch unit 51 performs a switching operation, for example, based on the VPI/VCI being the connection identification information of an input cell, and determines an output route according to a connection. If the input cell is identified to belong to a particular voice connection, the switch unit 51 outputs this cell to the trunk unit 52.

The trunk unit 52 performs one of an echo cancellor process for removing an echo of a far end signal superposed on a near end signal, an encoding process for converting voice data of an input cell into a particular voice code, a decoding process for converting a voice code of an input cell into voice data, a multiplexing process for multiplexing data of an input cell into an AAL type 2 cell, a demultiplexing process for demultiplexing data of an input cell from the AAL type 2, etc., and again inputs the cell to the switch unit 51.

As described above, the trunk unit 52 arranged within a switch performs various types of voice processing required to accommodate the STM data mapped onto the AAL type 1 cell, so that an IWF no longer need to perform these voice processing. As a result, the amount of equipment of the IWF can be reduced.

Furthermore, only a connection for which the voice processing must be performed can be selectively accommodated by the trunk unit 51 among all the connections accommodated by a switch. Accordingly, it is sufficient to arrange processing devices the number of which is equal to the number of connections for which the voice processing must be performed within the trunk unit 52 among all the connections handled by the IWF. Consequently, the amount of equipment can be significantly reduced in comparison with the case where processing devices are arranged within the IWF.

If a switch further comprises an input line unit for interfacing an input line of a cell and the switch unit 51, and an output line unit for interfacing an output line and the switch unit 51, the switch unit 51 perform the following switching operations.

In this case, the switch unit 51 performs a first switching operation for connecting the input and output line units for the cell of the connection for which the voice processing is not required, and performs a second switching operation for connecting the input line unit and the trunk unit 52 and for connecting the trunk unit 52 and the output line unit for the cell of the connection for which the voice processing is required.

Figure 2B:
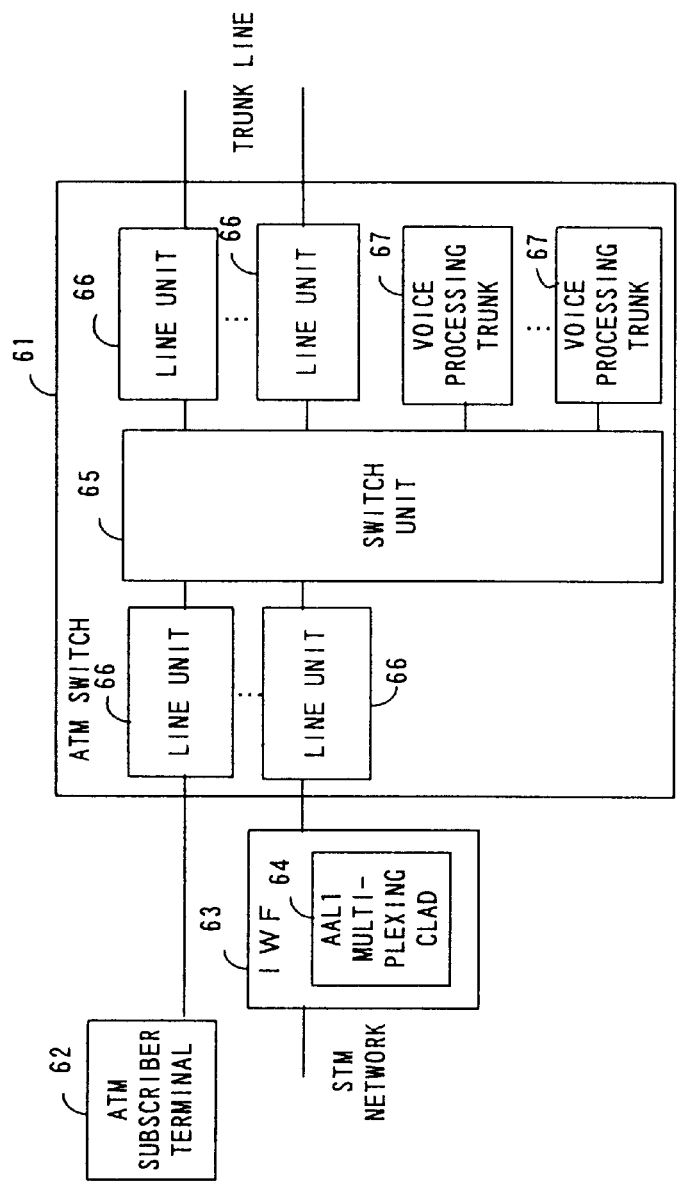
FIG. 2B is a block diagram showing the configuration of a communications system.

For example, the switch unit 51 shown in FIG. 2A corresponds to a switch unit 65 which is shown in FIG. 2B and will be described later, while the trunk unit 52 shown in FIG. 2A corresponds to a voice processing trunk 67 shown in FIG. 2B.

In a communications system according to the present invention, an AAL type 1 CLAD is arranged within an IWF which interconnects an ATM and an STM network, and performs cell/decell processing for the STM data by using the AAL type 1. One or more voice processing trunks are arranged within an ATM switch, which performs the processes of an echo cancellor, a voice encoder, an AAL type 2 CLAD, etc.

With the switching capability of an ATM switch, only a connection for which the above described processes are required can be selectively accommodated within a voice processing trunk among all the connections from an STM network. Accordingly, there is no need to prepare processing devices such as an echo cancellor, etc. for all the connections handled by an IWF, thereby reducing the amount of equipment of the entire system.

Figure 1E:
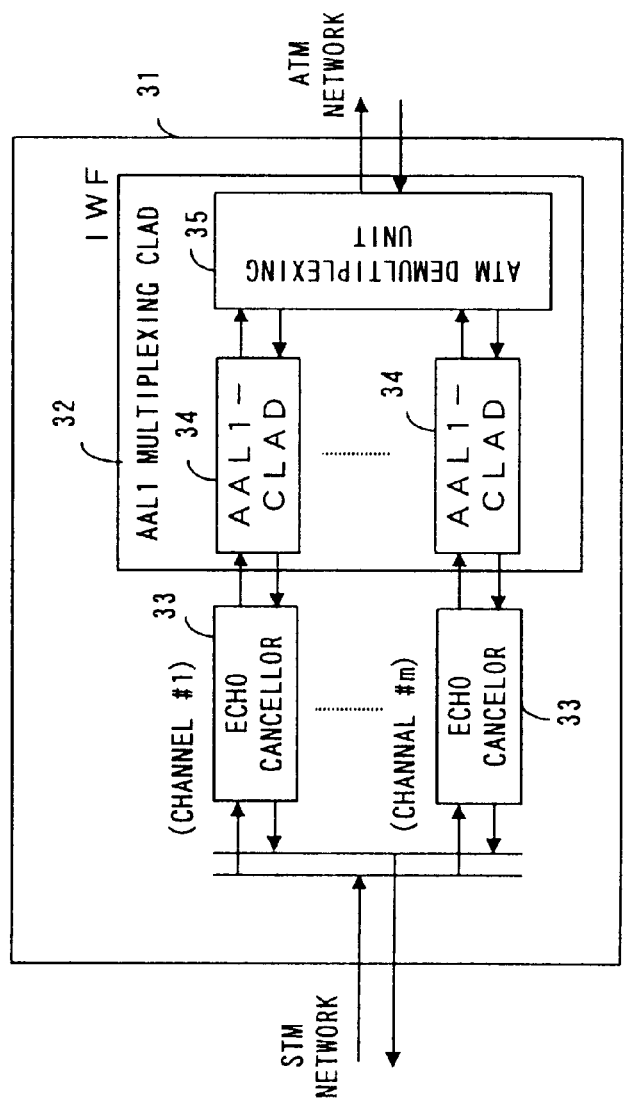
FIG. 1E is a block diagram showing the configuration of an IWF when an AAL type 1 is used.
Figure 1F:
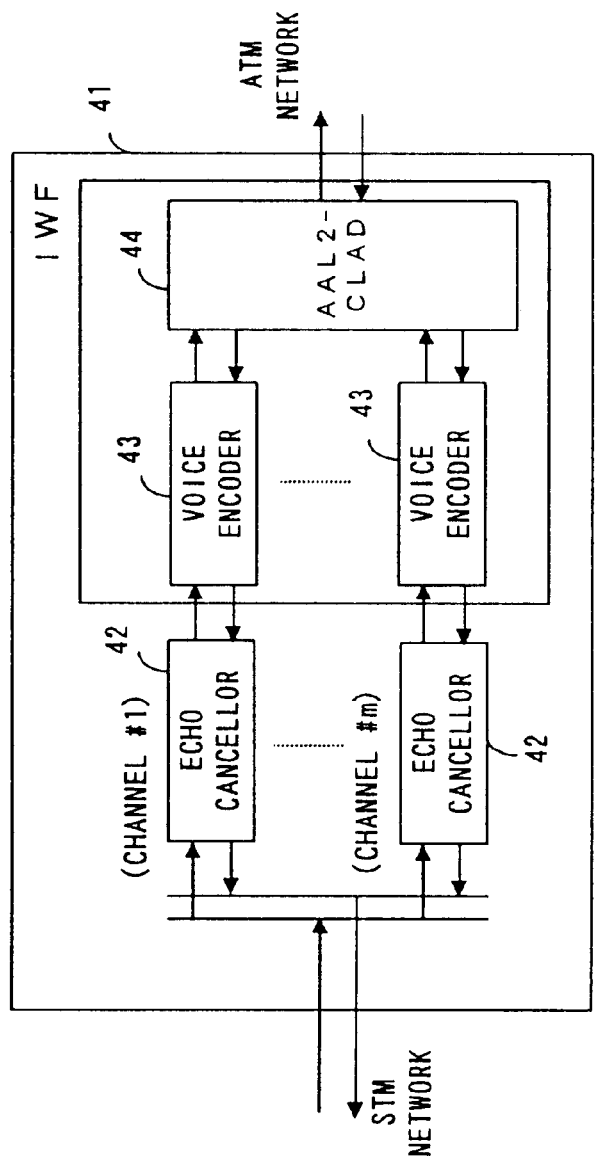
FIG. 1F is a block diagram showing the configuration of an IWF when an AAL type 2 is used.

FIG. 2B shows the fundamental configuration of a communications system including an ATM switch according to the present invention. The system shown in FIG. 2B comprises an ATM switch 61, an ATM subscriber terminal 62, and an IWF 63. The ATM subscriber terminal 62 is connected to the ATM switch 61, and the IWF 63 is arranged between an STM network and the ATM switch 61. The IWF 63 includes an AAL1 multiplexing CLAD 64 which has a capability similar to that of the AAL1 multiplexing CLAD 32 shown in FIG. 1E.

Additionally, the ATM switch 61 includes a switch unit 65, a plurality of line units 66 (subscriber line units or trunk line units), and one or a plurality of voice processing trunks 67. Each of the line units 66 maintains an interface consistency between the ATM subscriber terminal 62 and the trunk system. The switch unit 65 is a self-routing switch, and routes an input cell by referencing the value of the TAG attached to the cell.

FIG. 3 shows the method for switching a cell for use in the ATM switch 61 shown in FIG. 2B. STM data from an STM network is converted into an AAL type 1 cell within the IWF 63, and the converted cell is input to the ATM switch 61. Here, VPI/VCI conversion is performed within the line unit 66 connected to the IWF 63.

If the connection corresponding to the input cell is non-voice data, etc. and if there is no need to perform a particular voice process such as an echo cancellor process, etc., the line unit 66 converts the VPI/VCI of the input cell into those corresponding to the trunk line, and attaches a TAG to the cell. The switch unit 65 outputs the cell to a desired route (trunk line unit) by using the TAG attached to the cell, as indicated by a broken line.

If the connection corresponding to the input cell is voice data and if a particular voice process must be performed, the line unit 66 converts the VPI/VCI of the input cell into those corresponding to the voice processing trunk 67, and attaches a TAG to the cell. The switch unit 65 outputs the cell to a desired route (voice processing trunk) by using the TAG attached to the cell, as indicated by a solid line.

The voice processing trunk 67 again inputs the cell to the switch unit 65 as indicated by the solid line after performing a desired voice process such as an echo cancellor process, etc. for the input cell. The voice processing trunk 67 has a VPI/VCI switching capability similar to that of the line unit 66. It converts the VPI/VCI of the cell into those corresponding to the trunk line, attaches a TAG to the cell, and inputs the cell to the switch unit 65. The switch unit 65 outputs the cell to a desired route (trunk line unit) by using the TAG attached to the cell, as indicated by the solid line.

FIG. 3 shows the method for switching data flowing from an STM network into an ATM network. Switching operations are performed with a similar method also for a connection in the opposite direction, that is, the data from the ATM network to the STM network. First of all, the VPI/VCI of a cell from a trunk line of the ATM network are converted within the line unit 66.

If the connection corresponding to the input cell is non-voice data etc. and if there is no need to perform a particular voice process, the line unit 66 converts the VPI/VCI of the input cell into those corresponding to the IWF 63, and attaches a TAG to the cell. The switch unit 65 outputs the cell to a desired route (the line unit connected to the IWF) by using the TAG attached to the cell.

If the connection corresponding to the input cell is voice data and if a particular voice process must be performed, the line unit 66 converts the VPI/VCI of the input cell into those corresponding to the voice processing trunk 67, and attaches a TAG to the cell. The switch unit 65 outputs the cell to a desired route (voice processing trunk) by using the TAG attached to the cell.

The voice processing trunk 67 again inputs the cell to the switch unit 65 after performing a desired voice process. At this time, the voice processing trunk 67 converts the VPI/VCI of the cell into those corresponding to the output line to the IWF 63, and attaches a TAG to the cell. The switch unit 65 outputs the cell to a desired route (the line unit connected to the IWF) by using the TAG attached to the cell.

Whether the connection corresponding to an input cell requires a particular voice process is determined when the connection is set up, and the particular process is specified according to the VPI/VCI set in the cell. The VPI/VCI conversion table corresponding to the VPI/VCI is set in the line unit 66 and the voice processing trunk 67.

Provided next is the explanation about a preferred embodiment in the case where the voice processing trunk 67 includes an echo cancellor, by referring to FIGS. 4 through 14.

FIG. 4 exemplifies the configuration of such a voice processing trunk 67. The voice processing trunk 67 shown in FIG. 4 comprises an echo cancellor unit 71, a VPI/VCI conversion unit 72, and a VPI/VCI conversion table 73. The echo cancellor unit 71 removes an echo of an input cell. The VPI/VCI conversion unit 72 converts the VPI/VCI of a cell by referencing the VPI/VCI conversion table 73.

Figure 5:
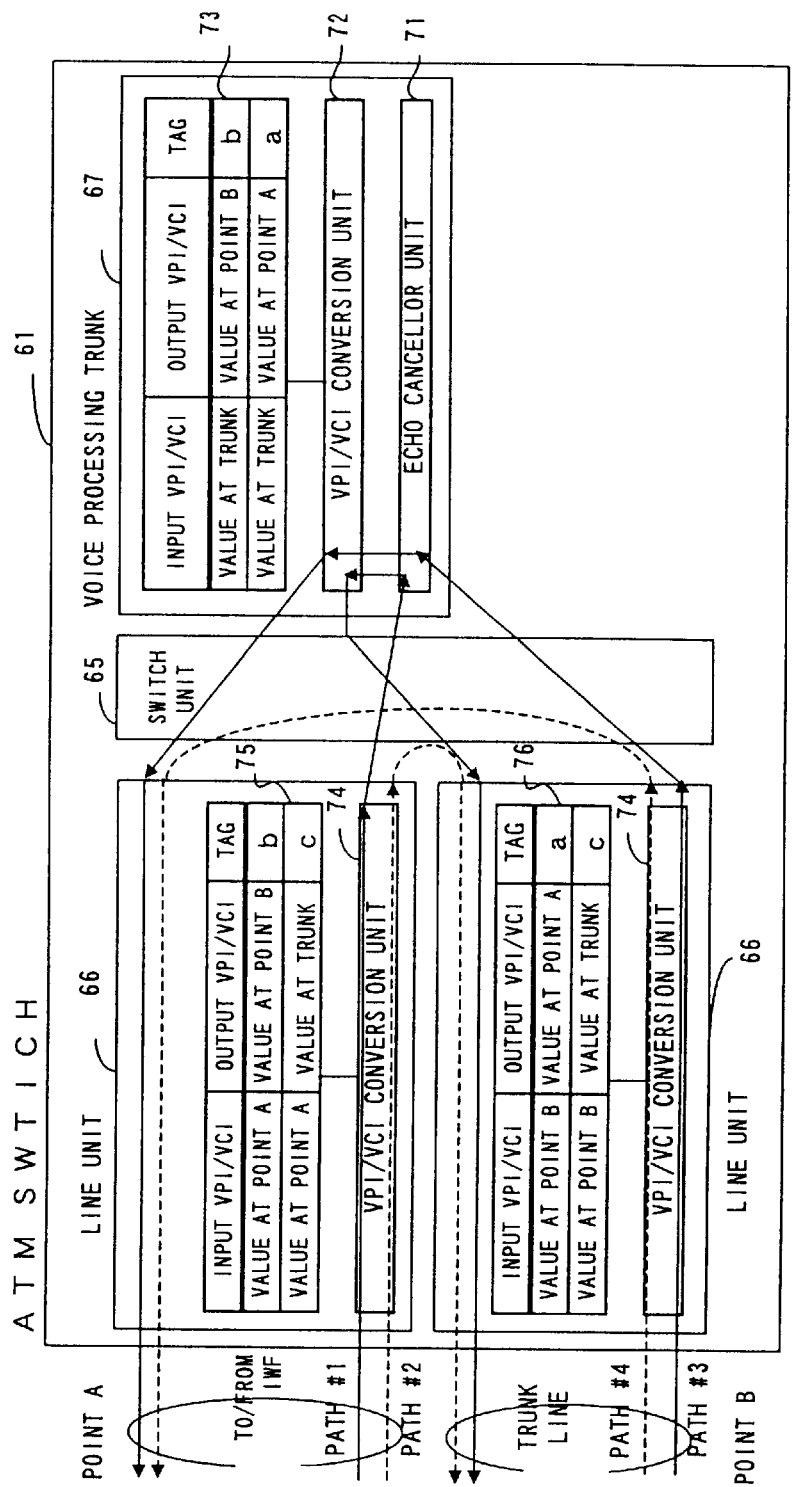
FIG. 5 shows a second switching method.

FIG. 5 shows the method for switching a cell for use in the ATM switch 61 including the voice processing trunk 67 shown in FIG. 4. In FIG. 5, a line unit 66 at a point A comprises a VPI/VCI conversion unit 74 and a VPI/VCI conversion table 75, while a line unit 66 at a point B comprises a VPI/VCI conversion unit 74 and a VPI/VCI conversion table 76.

In the VPI/VCI conversion tables 73, 75, and 76, TAGs "a", "b", and "c" respectively specify the route to the line unit 66 at the point A, the route to the line unit 66 at the point B, and the route to the voice processing trunk 67.

Provided next is the explanation about the case where connections handled by the ATM switch 61 are connections with small end-to-end transmission delays. In FIG. 5, paths #2 and #4 correspond to such connections.

STM data from the STM network is converted into an AAL type 1 cell within the IWF 63, and the cell is input from the point A to the ATM switch 61 (path #2). At this time, the VPI/VCI conversion unit 74 within the line unit 66 at the point A converts the VPI/VCI of the input cell into those corresponding to the trunk line at the point B, and attaches a TAG "b" to the cell by referencing the first line of the VPI/VCI conversion table 75. The switch unit 65 outputs the cell to the line unit 66 at the point B by using the TAG "b" attached to the cell.

For a connection in the opposite direction, that is, the data from the ATM network to the STM network, a cell is input from the trunk line at the point B (path #4). At this time, the VPI/VCI conversion unit 74 within the line unit 66 at the point B converts the VPI/VCI of the input cell into those corresponding to the output line at the point A, and attaches the TAG "a" to the cell by referencing the first line of the VPI/VCI conversion table 76. The switch unit 65 outputs the cell to the line unit 66 at the point A by using the TAG "a" attached to the cell.

Provided next is the case where the connections handled by the ATM switch 61 are connections with large end-to-end transmission delays. In FIG. 5, paths #1 and #3 correspond to such connections.

STM data from the STM network is converted into an AAL type 1 cell within the IWF 63, and the cell is input from the point A to the ATM switch 61 (path #1). At this time, the VPI/VCI conversion unit 74 within the line unit 66 at the point A converts the VPI/VCI of the input cell into those corresponding to the voice processing trunk 67, and attaches a TAG "c" to the cell by referencing the second line of the VPI/VCI conversion table 75. The switch unit 65 outputs the cell to the voice processing trunk 67 by using the TAG "c" attached to the cell.

The echo cancellor unit 71 within the voice processing trunk 67 performs an echo cancellor process for the input cell, and outputs the cell to the VPI/VCI conversion unit 72. The VPI/VCI conversion unit 72 converts the VPI/VCI of the cell into those corresponding to the trunk line at the point B, and attaches a TAG "b" to the cell by referencing the first line of the VPI/VCI conversion table 73, and outputs the cell to the switch unit 65. The switch unit 65 outputs the cell to the line unit 66 at the point B by using the TAG "b" attached to the cell.

For a connection in the opposite direction, that is, the data from the ATM network to the STM network, a cell is input from the trunk line at the point B (path #3). The VPI/VCI conversion unit 74 within the line unit 66 at the point B converts the VPI/VCI of the input cell into those corresponding to the voice processing trunk 67, and attaches a TAG "c" to the cell by referencing the second line of the VPI/VCI conversion table 76. The switch unit 65 outputs the cell to the voice processing trunk 67 by using the TAG "c" attached to the cell.

The echo cancellor unit 71 within the voice processing trunk 67 performs the echo cancellor process for the input cell, and outputs the cell to the VPI/VCI conversion unit 72. The VPI/VCI conversion unit 72 converts the VPI/VCI of the cell into those corresponding to the output line at the point A, and attaches a TAG "a" to the cell by referencing the second line of the VPI/VCI conversion table 73. The VPI/VCI conversion unit 72 then outputs the cell to the switch unit 65. The switch unit 65 outputs the cell to the line unit 66 at the point A by using the TAG "a" attached to the cell.

As described above, it becomes possible to perform the echo cancellor process for the cell input to the ATM switch 61 by arranging the echo cancellor 71 within the voice processing trunk 67. Additionally, the cell for which the echo cancellor process has been performed is again input to the switch unit 65 by arranging the VPI/VCI conversion unit 72. As a result, the cell can be output from the ATM switch 61 to a desired route.

By the way, the role of the echo cancellor unit 71 is to remove an echo of a farther party signal such as the one on the path #3, which is superposed on a nearer party signal such as the one on the path #1. To implement this removal operation, the echo cancellor unit 71 processes the data of the nearer party signal by using the data of the farther party signal. In other words, it is sufficient for the echo cancellor unit 71 to only reference the farther party signal without processing it. Therefore, another switching method shown in FIG. 6 can be considered for the path #3.

Figure 6:
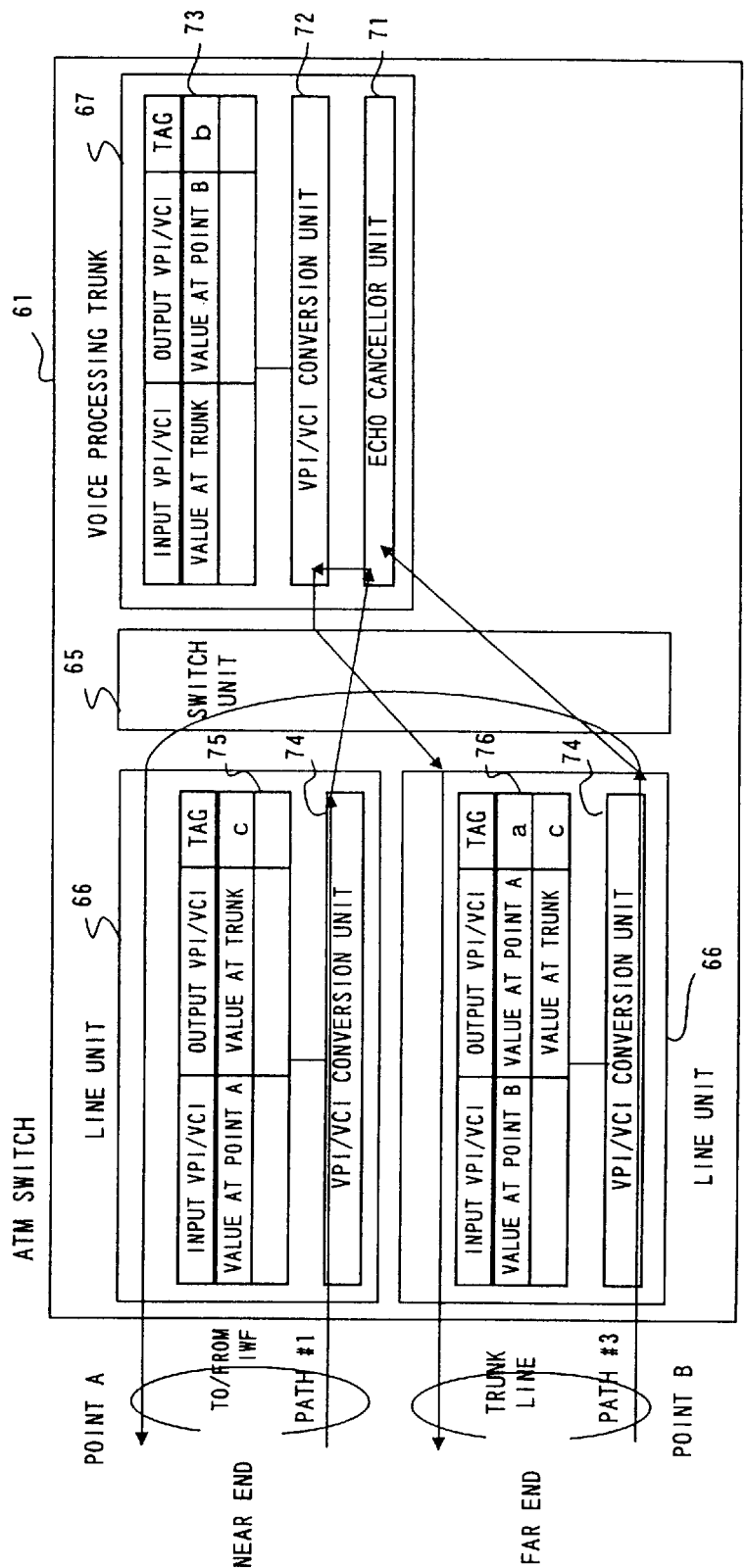
FIG. 6 shows a third switching method.

In FIG. 6, the switching method for the path #1 corresponding to the near end signal is similar to that shown in FIG. 5. For the path #3 corresponding to the far end signal, a cell is input from the trunk line at the point B. At this time, the VPI/VCI conversion unit 74 within the line unit 66 at the point B converts the VPI/VCI of the input cell into those corresponding to the output line at the point A, and attaches a TAG "a" to the cell by referencing the first line of the VPI/VCI conversion table 76.

Additionally, the VPI/VCI conversion unit 74 duplicates the input cell, converts the VPI/VCI of the duplicate cell into those corresponding to the voice processing trunk 67, and attaches a TAG "c" to the duplicate cell by referencing the second line of the VPI/VCI conversion table 76. As a method for duplicating a cell within the line unit 66, for example, the technique disclosed by the Japanese Laid-open Patent Application No. 5-37547 can be used.

The switch unit 65 outputs the cell with the TAG "a" attached to the line unit 66 at the point A, and outputs the duplicate cell with the TAG "c" attached to the voice processing trunk 67 by using the TAG attached to each cell. The echo cancellor unit 71 within the voice processing trunk 67 removes the echo of the cell on the path #1 by using the input duplicate cell as the far end signal, and discards the duplicate cell which has been used.

In this case, the switch unit 65 performs an operation for connecting the input from the line unit 66 at the point B to the line unit 66 at the point A and the voice processing trunk 67 in a 1-to-multi correspondence.

With such a switching method, the cell of the far end signal can be output from the ATM. switch 61 not via the voice processing trunk 67, thereby speeding up the switching operation. Additionally, since the duplicate cell of the far end signal is discarded by the echo cancellor unit 71, the operations of the VPI/VCI conversion unit 72 and the data of the VPI/VCI conversion table 73 can be simplified.

This preferred embodiment refers to the example where a cell is duplicated by the line unit 66. However, the switch unit 65, etc. may be considered as the cell duplication location, which is not always limited to the line unit 66.

FIG. 7 exemplifies the configuration of the echo cancellor unit 71. The echo cancellor unit 71 shown in this figure comprises a cell distributing unit 81, "n" echo cancellors 82 (#1 through #n), and a cell multiplexing unit 83. The cell distributing unit 81 distributes an input cell to a corresponding particular echo cancellor 82 by referencing the VPI/VCI of the cell. Each of the echo cancellors 82 removes an echo for each channel. The cell multiplexing unit 83 multiplexes the cells from the plurality of echo cancellors 82, and outputs the multiplexed cell.

The number of echo cancellors 82 "n" may be arbitrary. However, since the hardware of each cancellor is considerably large as described above, it is desirable to arrange echo cancellors 82 as few as possible. Practically, it is sufficient to arrange echo cancellors 82 the number of which is equal to the number of voice channels for which an echo compensation is required. This number is, for example, approximately 20 percent of the total number of channels to be accommodated.

With the switching method shown in FIG. 5, by way of example, the data shown in FIG. 8 are registered to the VPI/VCI conversion table 75 within the line unit at the point A when respective connections are set up. An "input VPI/VCI" indicates the VPI/VCI before being converted, and is assigned the values at the point A. An "output VPI" indicates the VPI after being converted. For the connection of a near end signal, which must pass through the echo cancellor 82, the value 1 is set as the output VPI. For the connection of non-voice data, etc., which does not need to pass through the echo cancellor 82, the value at the point B is set.

An output VCI indicates the VCI after being converted. For the connection which passes through the echo cancellor 82, one of the circuit numbers (#1 through #n) of the echo cancellors 82 is set. For the connection which does not pass through the echo cancellor 82, the value at the point B is set. A TAG indicates routing information attached to a cell. For the connection which passes through the echo cancellor 82, "c" is set. For the connection which does not pass through the echo cancellor 82, "b" is set.

At this time, for example, the data shown in FIG. 9 are registered to the VPI/VCI conversion table 76 within the line unit 66 at the point B when respective connections are set up. The value at the point B is set in the input VPI/VCI column. For the connection of a far end signal, which must pass through the echo cancellor 82, the value "0" is set in the output VPI column. For the connection of non-voice data, etc., which does hot need to pass through the echo cancellor 82, the value at the point A is set in the output VPI column.

In an output VCI column, one of the circuit numbers (#1 through #n) of the echo cancellors 82 is set for the connection which passes through the echo cancellor 82, while the value at the point A is set for the connection which does not pass through the echo cancellor 82. In a TAG column, "c" is set for the connection which passes through the echo cancellor 82, while "a" is set for the connection which does not pass through the echo cancellor 82.

When a cell is input from the switch unit 65 based on the VPI/VCI conversion tables 75 and 76, the cell distributing unit 81 determines the output destination of the input cell by referencing the VCI of the cell. For example, if the VCI is "1", the cell distributing unit 81 outputs the cell to the echo cancellor #1. If the VCI is "2", the cell distributing unit 81 outputs the cell to the echo cancellor #2.

The echo cancellor 82 references the VPI of the input cell. If the VPI is "0", the echo cancellor 82 determines that the cell is a far end signal, uses the data as the reference data for removing an echo, and outputs the cell after being used to the cell multiplexing unit 83. If the VPI is "1", the cell distributing unit 81 determines that the cell is a near end signal, and outputs the cell to the cell multiplexing unit 83 after removing the echo of the data.

With the switching method shown in FIG. 6, data similar to those shown in FIG. 8 are registered to the VPI/VCI conversion table 75, while data for routing the cell of the far end signal to the point A and for routing its duplicate cell to the voice processing trunk 67 are registered to the VPI/VCI conversion table 76. For the duplicate cell, "0" is set in the output VPI column, one of the circuit numbers (#1 through #n) of the echo cancellors 82 is set in the output VCI column, and "c" is set in the TAG column.

At this time, the cell distributing unit 81 outputs the input cell to a corresponding echo cancellor 82 by referencing the VCI of the cell. The echo cancellor 82 references the VPI of the input cell. If the VPI is "0", the echo cancellor 82 determines that the cell is the far end signal, captures the data as the reference data for removing an echo, and discards the cell. If the VPI is "1", the echo cancellor 82 determines that the cell is the near end signal, and outputs the cell to the cell multiplexing unit 83 after removing the echo of the data.

Figure 10:
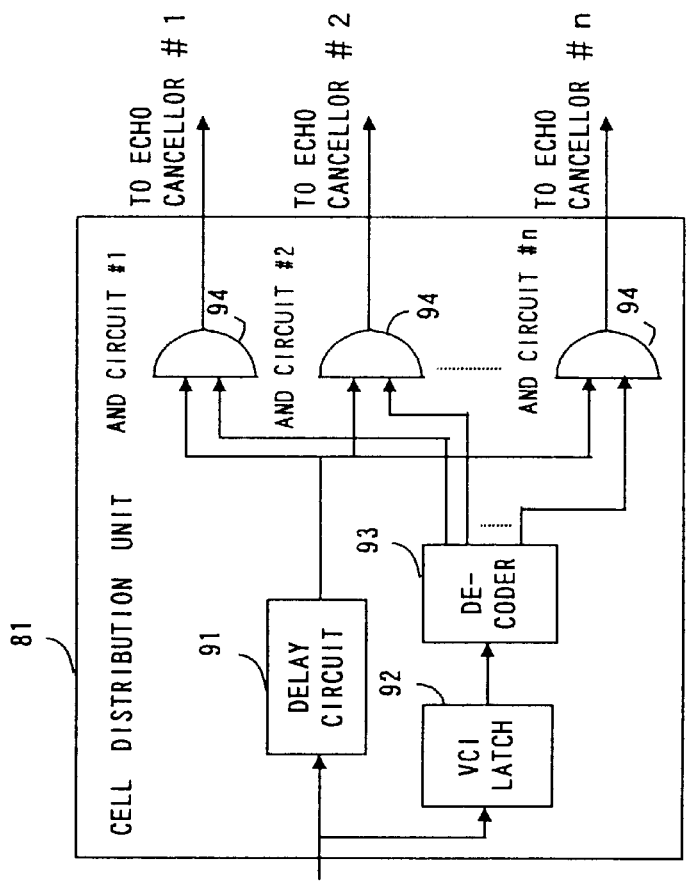
FIG. 10 shows the configuration of a first cell distributing unit.

If the VCI is corresponded to the circuit number of an echo cancellor 82 as described above, the cell distributing unit 81 can be configured, for example, by using the circuit shown in FIG. 10. The cell distributing unit 81 shown in FIG. 10 comprises a delay circuit 91, a VCI latch 92, a decoder 93, and "n" AND circuits 94 (#1 through #n).

The delay circuit 91 delays an input cell by a predetermined amount of time, and outputs the delayed cell to each of the AND circuits 94. The VCI latch 92 latches the value of the VCI from the header of the input cell, and outputs the latched value to the decoder 93. The decoder 93 decodes the VCI, and outputs the logic "1" or "0" to each of the AND circuits 94. Each of the AND circuits 94 outputs the ANDed result of the outputs of the delay circuit 91 and the decoder 93. The outputs of the AND circuits #1 through #n are respectively input to the echo cancellors #1 through #n.

Assuming that the cell having the VCI value "2" is input, the decoder 93 outputs the logic "1" only to the AND circuit #2, and outputs the logic "0" to the other AND circuits 94. As a result, the data of the input cell is output only from the AND circuit #2, and the value "0" is output from the other AND circuits 94. In this way, the input cell is distributed to the echo canceller #2. Similar distribution operations are performed also for the other VCI values.

Figure 11:
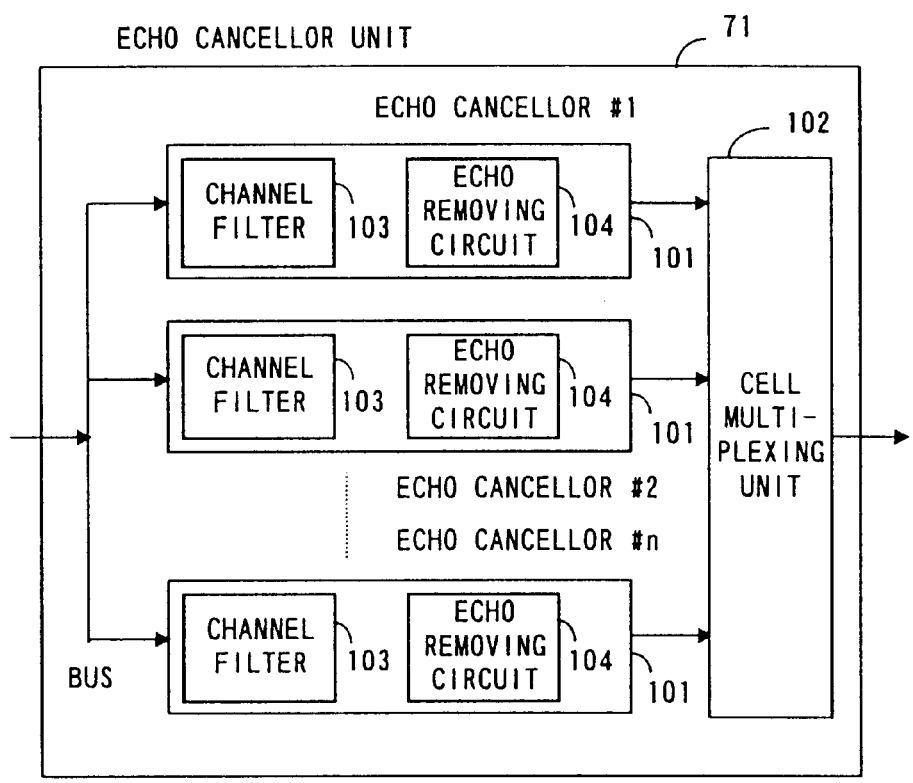
FIG. 11 shows the configuration of a second echo cancellor unit.

FIG. 11 exemplifies another configuration of the echo cancellor unit 71. The echo cancellor unit 71 shown in this figure comprises "n" echo cancellors 101 and a cell multiplexing unit 102. This echo cancellor unit 71 does not include the cell distributing unit 81 shown in FIG. 7, and the input from the switch unit 65 and "n" echo cancellors 101 are connected by a bus in a 1-to-multi correspondence.

Each of the echo cancellors 101 includes a channel filter 103 and an echo removing circuit 104, and is intended to remove an echo of each channel. Each of the channel filters 103 has a capability for passing only the input cell having the VCI value corresponding to the circuit number (#1 through #n) of the echo cancellor 101 including the local channel filter 103. The cell multiplexing unit 102 multiplexes the cells from the plurality of echo cancellors 101, and outputs the multiplexed cell.

Figure 12:
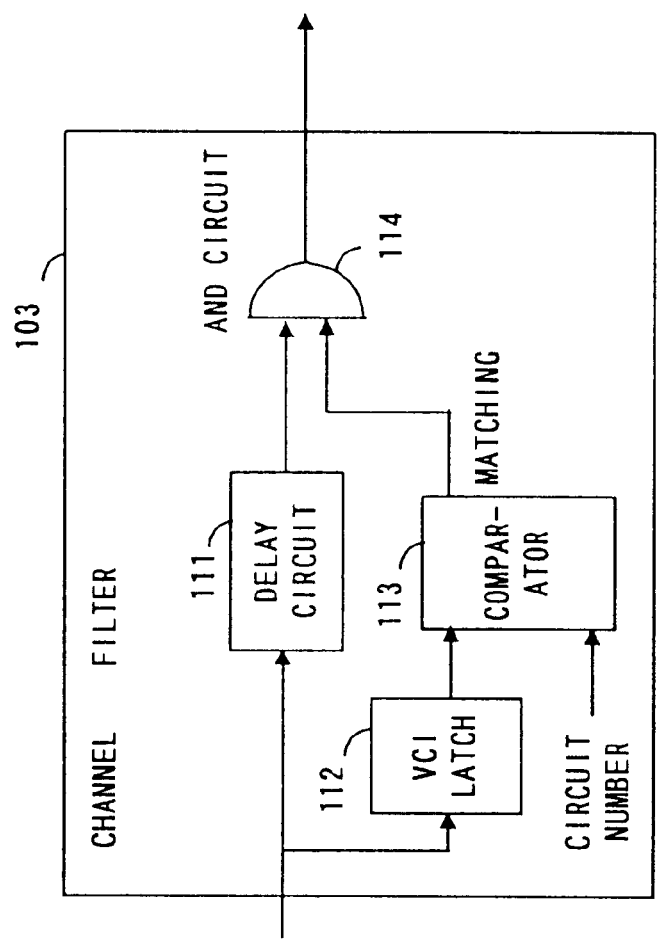
FIG. 12 shows the configuration of a channel filter.

Each of the channel filters 103 is configured, for example, by the circuit shown in FIG. 12. The channel filter 103 shown in FIG. 12 comprises a delay circuit 111, a VCI latch 112, a comparator 113, and an AND circuit 114.

The delay circuit 111 delays an input cell by a predetermined amount of time, and outputs the delayed cell to the AND circuit 114. The VCI latch 112 latches the value of the VCI from the header of the input cell, and outputs the latched value to the comparator 113. The comparator 113 makes a comparison between a predetermined circuit number and the VCI value. If they match, the comparator 113 outputs the logic "1" to the AND circuit 114. If they mismatch, the comparator 113 outputs the logic "0". The AND circuit 114 outputs the ANDed result of the outputs of the delay circuit 111 and the comparator 113 to a corresponding echo removing circuit 104.

For example, in the channel filter 103 within the echo cancellor #2, the comparator 113 makes a comparison between the VCI of the input cell and the circuit number "2".

Accordingly, only when the cell having the VCI value "2" is input, the comparator 113 outputs the logic "1", and the AND circuit 114 outputs the data of the input cell. The cell having the other VCI values cannot pass through this channel filter 103.

FIG. 13 exemplifies a further configuration of the echo cancellor unit 71. The echo cancellor unit 71 shown in this figure comprises "n" echo cancellors 121. Each of the echo cancellors 121 comprises the channel filter 103 and the echo removing circuit 104, which are shown in FIG. 11, and an output controlling circuit 122.

This echo cancellor unit 71 does not include the cell multiplexing unit 102 shown in FIG. 11, and the outputs of the "n" echo cancellors 121 and the output of the echo cancellor unit 71 are connected in a multi-to-1 correspondence. The output controlling circuit 122 is arranged within each of the echo cancellors 121 instead of the cell multiplexing unit 102.

This output controlling circuit 122 is configured, for example, by the circuit shown in FIG. 14. The output controlling circuit 122 shown in FIG. 14 comprises a gate circuit 131, a timer 132, and a comparator 133.

The gate circuit is controlled by the output of the comparator 131, and outputs the data input from the corresponding echo removing circuit 104 to a bus. The timer 132 is started when a cell is input to the echo cancellor 121, and measures time. The comparator 133 makes a comparison between the output value of the timer 132 and a predetermined internal processing time of the echo cancellor 121. When the output value of the timer 132 reaches the internal processing time, the comparator 133 provides the gate circuit 131 with the signal for outputting data therefrom.

If the amount of time that an input cell requires to pass through the channel filter 103 and the echo removing circuit 104 is preset as the internal processing time, the cell is output from the gate circuit 131 upon termination of an echo removal from each channel. Furthermore, if the processing delay times of the channel filter 103 and the echo removing circuit 104 are the same within the "n" echo cancellors 121, cells are suitably multiplexed by arranging such an output controlling circuit 122 despite the absence of the cell multiplexing unit 102.

The above described preferred embodiment refers to the switching method for use in the case where the voice processing trunk 67 includes an echo cancellor unit. However, a similar method can be also applied if the voice processing trunk 67 includes a voice encoder/decoder, an AAL type 2 cell/decell processing circuit, etc. Next, a preferred embodiment of such a voice processing trunk 67 is explained by referring to FIGS. 15 through 21.

Figure 15:
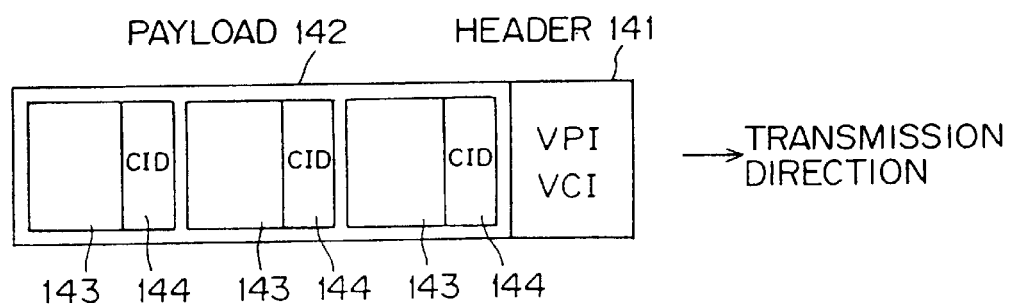
FIG. 15 shows the structure of an AAL2 cell.

FIG. 15 exemplifies an AAL type 2 cell. The cell shown in this figure is composed of a header 141 and a payload 142. The header 141 includes a VPI/VCI, while the payload 142 includes one or more short cells 143. Since all of these short cells do not always include the data of the same channel, a CID (Channel IDentifier) for identifying a channel is attached to each of the headers 144 of the short cells.

Figure 16:
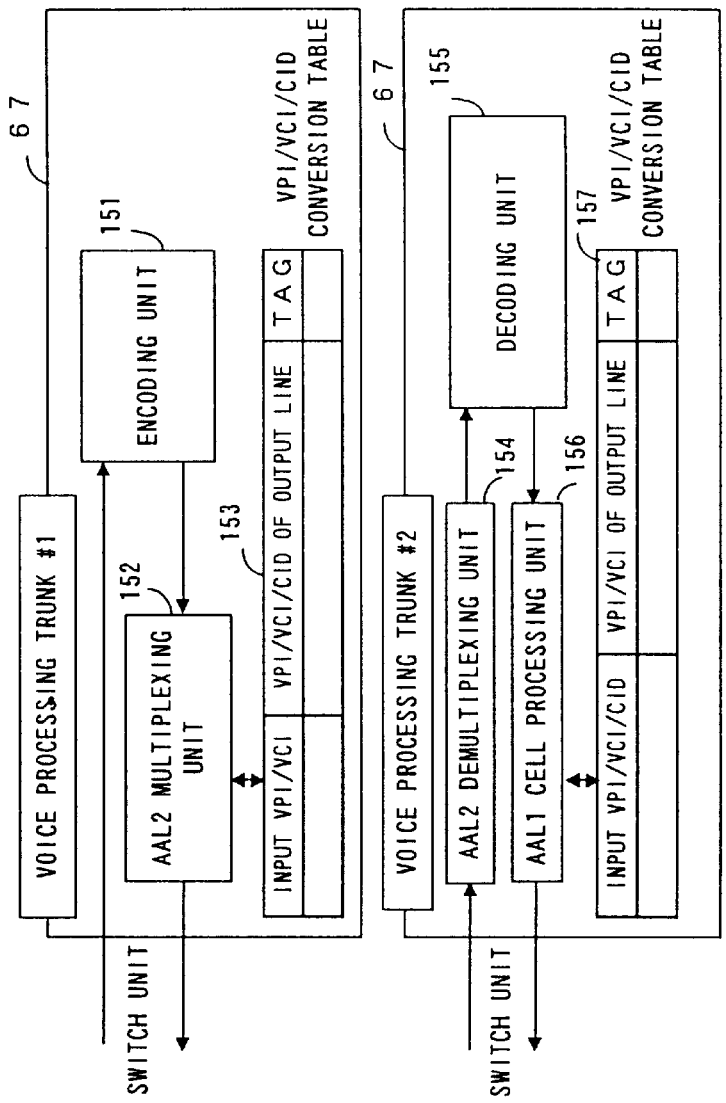
FIG. 16 shows the configuration of a second voice processing trunk.

FIG. 16 exemplifies the configurations of the two voice processing trunks 67 (#1 and #2) which handle such an AAL type 2 cell. The voice processing trunk #1 shown in FIG. 16 includes an encoding unit 151, an AAL2 multiplexing unit 152, and a VPI/VCI/CID conversion table 153, and generates an AAL type 2 cell from the AAL type 1 cell input from the IWF 63 shown in FIG. 2B.

The encoding unit 151 reduces the amount of data of an input cell by encoding the data of the cell. The AAL2 multiplexing unit 152 generates short cells from the output of the encoding unit 151, and generates an AAL type 2 cell by combining the short cells. At this time, the AAL2 multiplexing unit 152 converts the VPI/VCI, and attaches a CID to each of the short cells by referencing the VPI/VCI/CID conversion table 153.

The voice processing trunk #2 includes an AAL2 demultiplexing unit 154, a decoding unit 155, an AAL1 cell processing unit 156, and a VPI/VCI/CID conversion table 157. This trunk generates an AAL type 1 cell from the AAL type 2 cell input from a trunk line.

The AAL2 demultiplexing unit 154 demultiplexes short cells from the input cell, and outputs the data of each of the short cells to the decoding unit 155. The decoding unit 155 restores the original data by decoding the input data. The AAL1 cell processing unit 156 generates an AAL type 1 cell from the output of the decoding unit 155. At this time, the AAL1 cell processing unit 156 converts the VPI/VCI by referencing the VPI/VCI/CID conversion table 157.

As the encoding and decoding algorithms of the encoding unit 151 and the decoding unit 155, arbitrary algorithms including ADPCM (Adaptive Differential Pulse-Code Modulation), VSELP (Vector Sum Excited Linear Prediction), and PSICELP (Pitch Synchronous Innovation Code Excited Linear Prediction) can be used.

FIG. 17 shows a cell switching method for use in the ATM switch 61 including the voice processing trunk 67 shown in FIG. 16. In this figure, the line unit 66 at the point A includes a VPI/VCI conversion unit 158 and a VPI/VCI conversion table 159, while the line unit 66 at the point B includes a VPI/VCI conversion unit 158 and a VPI/VCI conversion table 160.

In the VPI/VCI/CID conversion tables 153 and 157 and the VPI/VCI conversion tables 159 and 160, TAGs "a", "b", "c", and "d" respectively specify the route to the line unit 66 at the point A, the route to the line unit 66 at the point B, the route to the voice processing trunk #1, and the route to the voice processing trunk #2.

In FIG. 17, the switching method for use in the case where the connections handled by the ATM switch 61 do not require the voice encoding/decoding processes (the paths #2 and #4), is similar to that for use in the case where the connections have small end-to-end transmission delays in FIG. 5 (the paths #2 and #4).

Provided next is the explanation about the case where the connections handled by the ATM switch 61 require the voice encoding/decoding processes. In FIG. 17, the paths #1 and #3 correspond to such connections.

STM data from an STM network is converted into the an AAL type 1 cell within the IWF 63, and the cell is input to the ATM switch 61 from the point A. At this time, the VPI/VCI conversion unit 158 within the line unit 66 at the point A converts the VPI/VCI of the input cell into those corresponding to the voice processing trunk #1, and attaches a TAG "c" to the cell by referencing the second line of the VPI/VCI conversion table 159. The switch unit 65 outputs the cell to the voice processing trunk #1 by using the TAG "c" attached to the cell.

The voice processing trunk #1 again inputs the cell to the switch unit 65 after performing the encoding process for the input cell. First of all, the encoding unit 151 converts a PCM (Pulse-Code Modulation) code being the digital data of the AAL type 1 into a particular voice code, and outputs the converted code to the AAL2 multiplexing unit 152.

The AAL2 multiplexing unit 152 converts the voice code from the encoding unit 151 into an AAL type 2 cell. At this time, the AAL2 multiplexing unit 152 converts the VPI/VCI of the cell into those corresponding to the trunk line at the point B, attaches CIDs to short cells, and attaches a TAG "b" to the cell by referencing the first line of the VPI/VCI/CID conversion table 153. The switch unit 65 outputs the cell to the line unit 66 at the point B by using the TAG "b" attached to the cell. For the connection in the opposite direction, that is, the data from the ATM network to the STM network, an AAL type 2 cell is input from the trunk line at the point B (the path #3). The VPI/VCI conversion unit 158 within the line unit 66 at the point B converts the VPI/VCI of the input cell into those corresponding to the voice processing trunk #2, and attaches a TAG "d" to the cell by referencing the second line of the VPI/VCI conversion table 160. The switch unit 65 outputs the cell to the voice processing trunk #2 by using the TAG "d" attached to the cell.

The voice processing trunk #2 again inputs the cell to the switch unit 65 after performing the voice decoding process for the input cell. First of all, the AAL2 demultiplexing unit 154 demultiplexes each connection data corresponding to each short cell from the AAL type 2 cell, and outputs the data to the decoding unit 155 as a voice code. The decoding unit 155 converts the voice code into a PCM code, and outputs the PCM code to the AAL1 cell processing unit 156.

The AAL1 cell processing unit 156 converts the PCM code from the decoding unit 155 into an AAL type 1 cell. At this time, the AAL1 cell processing unit 156 converts the VPI/VCI of the cell into those corresponding to the output line at the point A, and attaches a TAG "a" to the cell by referencing the first line of the VPI/VCI/CID conversion table 157. The switch unit 65 outputs the cell to the line unit 66 at the point A by using the TAG "a" attached to the cell.

As described above, an AAL type 1 cell input to the ATM switch 61 can be encoded and converted into an AAL type 2 cell by arranging the encoding unit 151 and the AAL2 multiplexing unit 152 within the voice processing trunk 67. Furthermore, an AAL type 2 cell input to the ATM switch 61 can be decoded and converted into an AAL type 1 cell by arranging the AAL2 demultiplexing unit 154, the decoding unit 155, and the AAL1 cell processing unit 156 within the voice processing trunk 67. Accordingly, the STM data converted into the AAL type 1 cell can be accommodated within the ATM network in the form of an AAL type 2 cell.

In the voice processing trunk 67 shown in FIG. 16, the VPI/VCI/CID conversion tables 153 and 157 can be directly accessed from the AAL2 multiplexing unit 152 and the AAL1 cell processing unit 156. Alternatively, the VPI/VCI conversion unit which accesses the VPI/VCI/CID conversion tables 153 and 157 may be separately arranged at a stage succeeding the AAL2 multiplexing unit 152 and the AAL1 cell processing unit 156, like the voice processing trunk 67 shown in FIG. 4.

In the configuration shown in FIG. 16, the encoding unit and the decoding unit 155 are respectively arranged within the two different voice processing trunks 67, which are respectively connected to different ports of the switch unit 65. However, the encoding unit 151 and the decoding unit 155 may be arranged within the same voice processing trunk 67, and connected to a single port.

Figure 18:
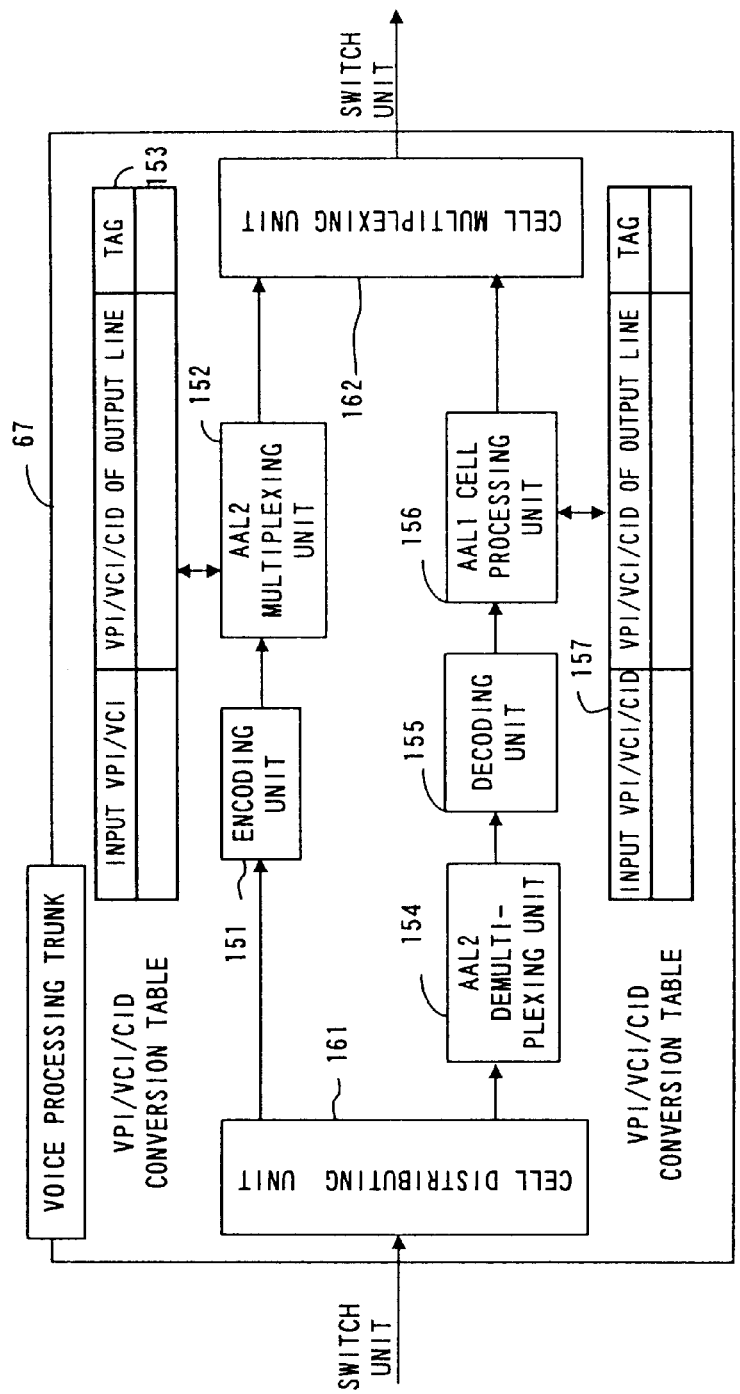
FIG. 18 shows the configuration of a third voice processing trunk.

FIG. 18 exemplifies the configuration of such a voice processing trunk 67. The voice processing trunk 67 shown in this figure comprises an encoding unit 151, an AAL2 multiplexing unit 152, a VPI/VCI/CID conversion table 153, an AAL2 demultiplexing unit 154, a decoding unit 155, an AAL1 cell processing unit 156, a VPI/VCI/CID conversion table 157, a cell distributing unit 161, and a cell multiplexing unit 162.

The cell distributing unit 161 is arranged at a stage preceding the encoding unit 151 and the AAL2 demultiplexing unit 154, and distributes a cell to the encoding unit 151 or the AAL2 demultiplexing unit 154 by referencing the VPI/VCI of the cell input from the switch unit 65.

For example, if the VPI of the input cell is "0", the cell distributing unit 161 outputs the cell to the encoding unit 151. If the VPI of the input cell is "1", the cell distributing unit 161 outputs the cell to the AAL2 demultiplexing unit 154. In this case, the input cell having the VPI value "0" corresponds to the AAL type 1, while the cell having the VPI value "1" corresponds to the AAL type 2.

The cell multiplexing unit 162 is arranged at a stage succeeding the AAL2 multiplexing unit 152 and the AAL1 cell processing unit 156. This unit multiplexes the input cells from the two routes, and outputs the multiplexed cell to the switch unit 65. The input cell from the AAL2 multiplexing unit 152 corresponds to the AAL type 2, while the input cell from the AAL1 cell processing unit 156 corresponds to the AAL type 1. The operations of the encoding unit 151, the AAL2 multiplexing unit 152, the AAL2 demultiplexing unit 154, the decoding unit 155, and the AAL1 cell processing unit 156 are the same as those described above.

Figure 19:
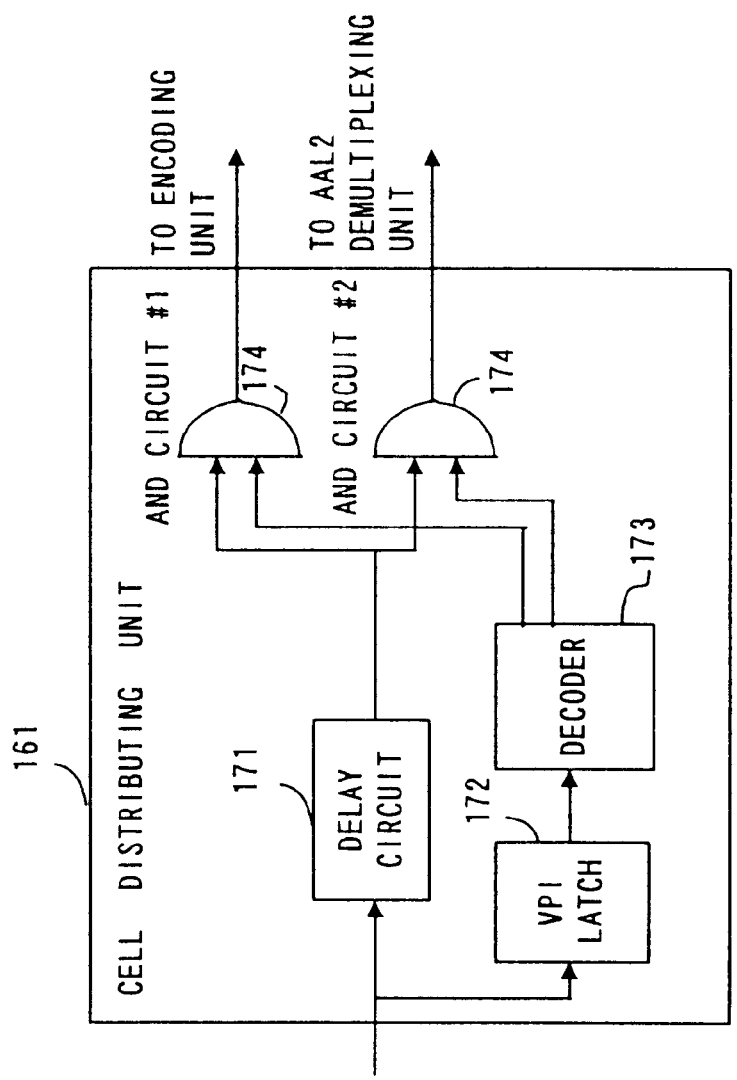
FIG. 19 shows the configuration of a second cell distributing unit.

The cell distributing unit 161 is configured, for example, by the circuit shown in FIG. 19. The cell distributing unit 161 shown in FIG. 19 includes a delay circuit 171, a VPI latch 172, a decoder 173, and two AND circuits 174 (#1 and #2).

The delay circuit 171 delays an input cell by a predetermined amount of time, and outputs the delayed cell to each of the AND circuits. The VPI latch 172 latches the value of the VPI from the header of the input cell, and outputs the latched value to the decoder 173. The decoder 173 decodes the VPI, and outputs the logic "1" or "0" to each of the AND circuits 174. Each of the AND circuits 174 outputs the ANDed result of the outputs of the delay circuit 171 and the decoder 173. The outputs of the AND circuits #1 and #2 are respectively input to the encoding unit 151 and the AAL2 demultiplexing unit 154.

For example, when the cell having the VPI value "0" is input, the decoder 173 respectively outputs the logic "1" and "0" to the AND circuits #1 and #2. As a result, the data of the input cell is output from the AND circuit #1, while the data "0" is output from the AND circuit #2. In this way, the input cell is distributed to the encoding unit 151.

When the cell having the VPI value "1" is input, the decoder 173 respectively outputs the logic "0" and "1" to the AND circuits #1 and #2. As a result, the data of the input cell is output from the AND circuit #2, while the data "0" is output from the AND circuit #1. In this way, the input cell is distributed to the AAL2 demultiplexing unit 154.

The switching method for use in the ATM switch 61 including such a voice processing trunk 67 is similar to that shown in FIG. 5. If the number of connections which require a voice encoding process is very small among the connections accommodated by the ATM switch 61, the number of used ports of the switch unit 65 can be reduced by adopting the voice processing trunk 67 shown in FIG. 18.

Additionally, the VPI/VCI conversion unit which accesses the VPI/VCI/CID conversion tables 153 and 157 may be arranged at a stage succeeding the AAL2 multiplexing unit 152 and the AAL1 cell processing unit 156 within the voice processing trunk 67 shown in FIG. 18, like the voice processing trunk 67 shown in FIG. 4.

Furthermore, in the configuration shown in FIG. 16, the portion which relates to the voice encoding/decoding processes, such as the encoding unit 151 and the decoding unit 155, and the portion which relates to the AAL type 2 processes, such as the AAL2 multiplexing unit 152 and the AAL2 demultiplexing unit 154, are arranged within the same voice processing trunk 67, and these portions are connected to one port of the switch unit 65. However, the portion which relates to the voice encoding/decoding processes and the portion which relates to the AAL type 2 processes may be respectively arranged within two different voice processing trunks 67, and the two voice processing trunks may be respectively connected to different ports of the switch unit 65.

For example, if the ATM switch 61 accommodates a plurality of connections whose encoding algorithms are different, the voice processing trunks #1 and #2 must be arranged for each of the algorithms in the configuration shown in FIG. 16. In this case, the equipment for the AAL type 2 processes becomes redundant.

However, it becomes possible to use an individual voice processing trunk 67 corresponding to each connection for the voice encoding/decoding processes, and to use the same voice processing trunk 67 for all of connections for the AAL type 2 processes, by separating the portion which relates to the voice encoding/decoding processes and the portion which relates to the AAL type 2 processes. In this case, the equipment for the AAL type 2 processes is shared by a plurality of connections.

Figure 20:
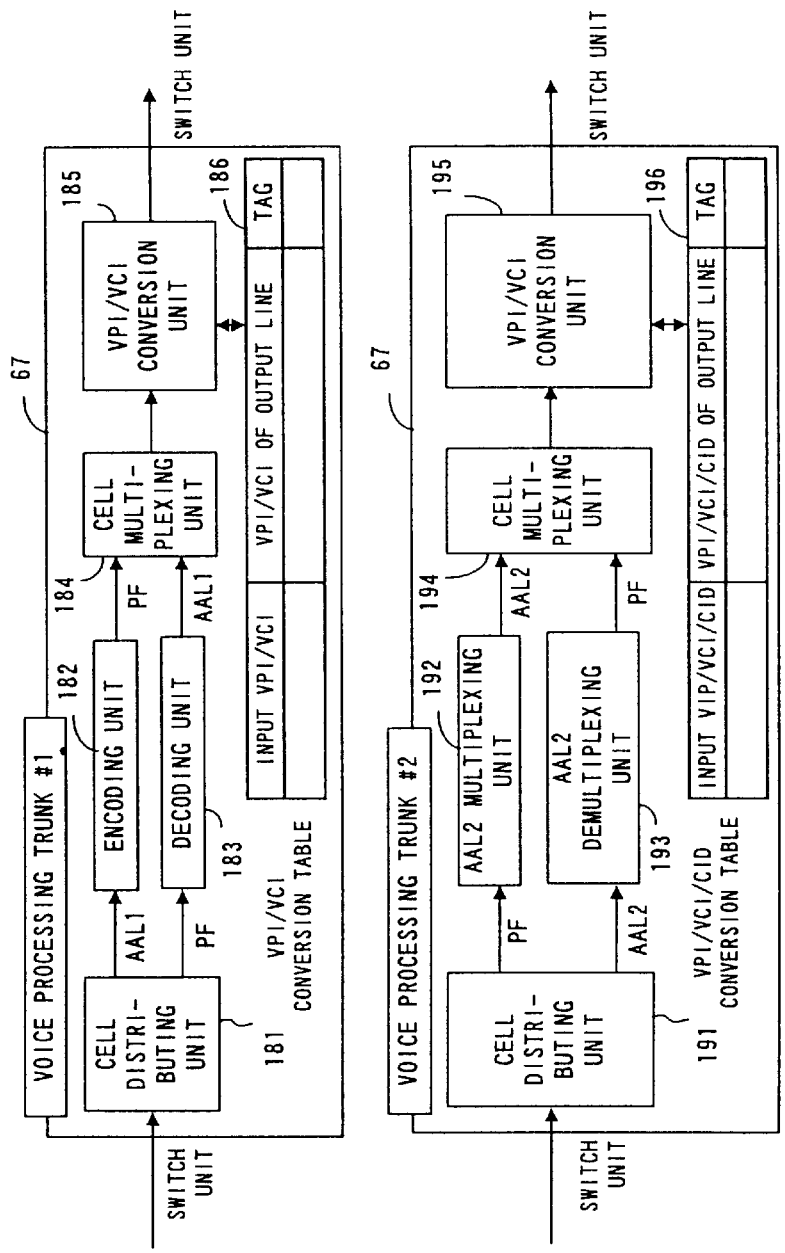
FIG. 20 shows the configuration of a fourth voice processing trunk.

FIG. 20 exemplifies the configurations of these two voice processing trunks 67 (#1 and #2). The voice processing trunk #1 includes a cell distributing unit 181, an encoding unit 182, a decoding unit 183, a cell multiplexing unit 184, a VPI/VCI conversion unit 185, and a VPI/VCI conversion table 186.

The cell distributing unit 161 distributes the cell input from the switch unit 65 to the encoding unit 182 or the decoding unit 183 by referencing the VPI/VCI of the cell. In this case, an AAL type 1 cell is output to the encoding unit 182, while a PF (Partially Filled) cell is output to the decoding unit 183.

The PF cell is a cell in a format such that data are stored from the beginning of a standard ATM cell by the number of pieces of significant data, and includes only one short cell. Since the corresponding connection is identified according to the VPI/VCI in this case, a CID is not attached to the PF cell.

The encoding unit 182 converts the PCM code of an AAL type 1 cell into a particular voice code, and outputs the data of the voice code as a PF cell. Accordingly, the point that the output is a PF cell is different from the encoding unit 151 shown in FIG. 18. Additionally, the decoding unit 183 converts the voice code of the PF cell into a PCM code, and outputs the cell as an AAL type 1 cell. Accordingly, the point that the input is a PF cell is different from the decoding unit 155 shown in FIG. 18.

The cell multiplexing unit 184 multiplexes the PF cell from the encoding unit 182 and the AAL type 1 cell from the decoding unit 183, and outputs the multiplexed cell. The VPI/VCI conversion unit 185 converts the VPI/VCI of the input cell by referencing the VPI/VCI conversion table 186, and outputs the cell to the switch unit 65.

The voice processing trunk #2 includes a cell distributing unit 191, an AAL2 multiplexing unit 192, an AAL2 demultiplexing unit 193, a cell multiplexing unit 194, a VPI/VCI conversion unit 195, and a VPI/VCI/CID conversion table 196.

The cell distributing unit 191 distributes the cell input from the switch unit 65 to the AAL2 multiplexing unit 192 or the AAL2 demultiplexing unit 193 by referencing the VPI/VCI of the cell. In this case, a PF cell is output to the AAL2 multiplexing unit 192, while an AAL type 1 cell is output to the AAL2 demultiplexing unit 193.

The AAL2 multiplexing unit 192 converts the format of an input cell from the PF format to the AAL type 2 format. At this time, data of several PF cells are multiplexed into one AAL type 2 cell. Accordingly, the point that the input is a PF cell is different from the AAL2 multiplexing unit 152 shown in FIG. 18.

The AAL2 demultiplexing unit 193 converts the format of an input cell from the AAL type 2 format to the PF format. At this time, several PF cells are demultiplexed from the data of one AAL type 2 cell. Accordingly, the point that the output is PF cells is different from the AAL2 demultiplexing unit 154 shown in FIG. 18.

The cell multiplexing unit 184 multiplexes the AAL type 2 cell from the AAL2 multiplexing unit 192 and the PF cell from the AAL2 demultiplexing unit 193, and outputs the multiplexed cell. The VPI/VCI conversion unit 195 converts the VPI/VCI/CID of an input cell by referencing the VPI/VCI/CID conversion table 196, and outputs the cell to the switch unit 65.

Figure 21:
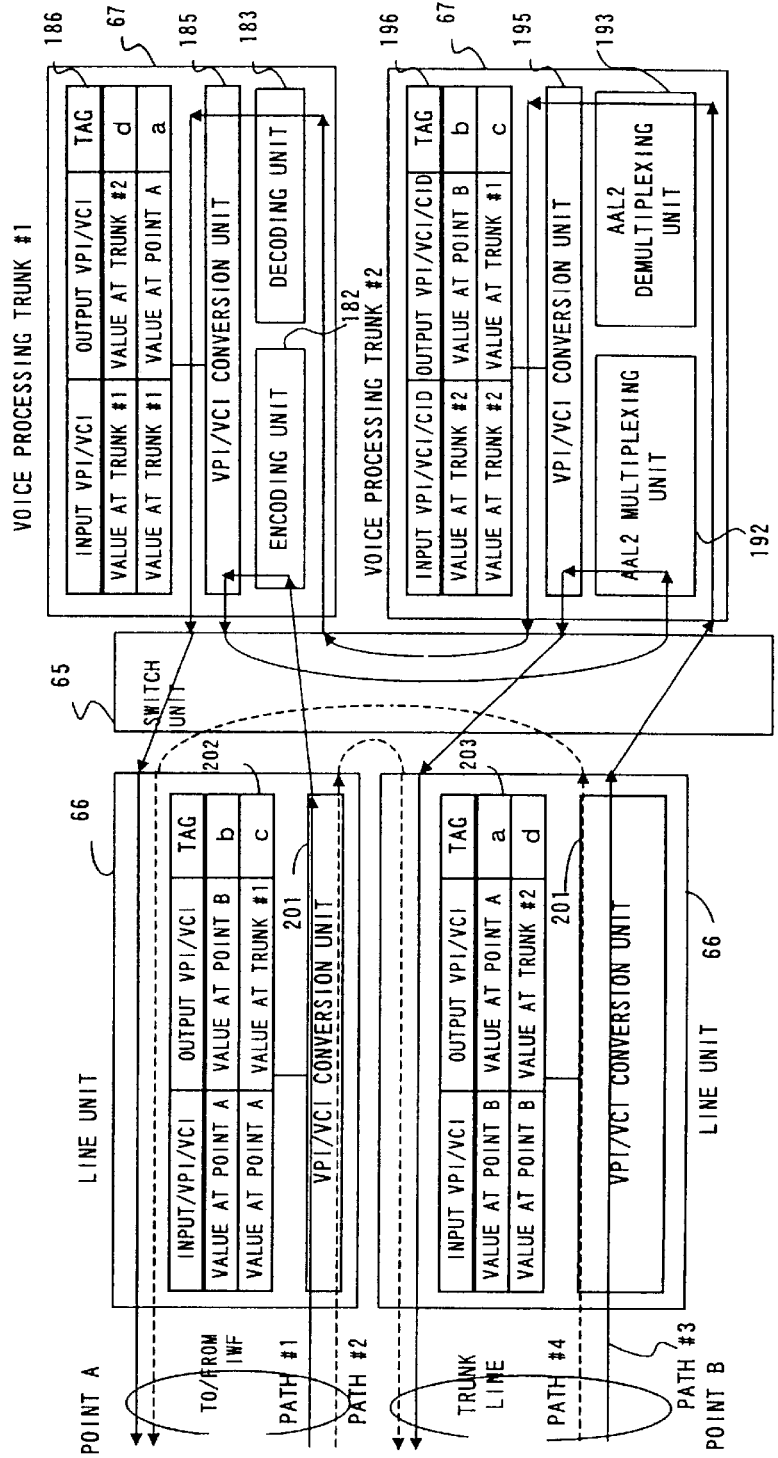
FIG. 21 shows a fifth switching method.

FIG. 21 shows a cell switching method for use in the ATM switch 61 which includes such voice processing trunks #1 and #2. In this figure, the line unit 66 at the point A includes a VPI/VCI conversion unit 201 and a VPI/VCI conversion table 202, while the line unit 66 at the point B includes a VPI/VCI conversion unit 201 and a VPI/VCI conversion table 203. The cell distributing units 181 and 191 and the cell multiplexing units 184 and 194, which are shown in FIG. 20, are omitted in FIG. 21.

In the VPI/VCI/CID conversion table 196 and the VPI/VCI conversion tables 186, 202, and 203, TAGs "a", "b", "c", and "d" respectively specify the route to the line unit 66 at the point A, the route to the line unit 66 at the point B, the route to the voice processing trunk 1, and the route to the voice processing trunk #2.

In FIG. 21, the switching method for use in the case where the connections handled by the ATM switch 61 do not require voice encoding/decoding processes (paths #2 and #4), is similar to that for use in the case where the connections having small end-to-end transmission delays (the paths #2 and #4) shown in FIG. 5.

Provided next is the explanation about the case where the connections handled by the ATM switch 61 require the voice encoding/decoding processes. In FIG. 21, paths #1 and #3 correspond to such connections.

STM data from an STM network is converted into an AAL type 1 cell within the IWF 63, and the cell is input from the point A to the ATM switch 61 (the path #1). At this time, the VPI/VCI conversion unit 201 within the line unit 66 at the point A converts the VPI/VCI of the input cell into those corresponding to the voice processing trunk #1, and attaches a TAG "c" to the cell by referencing the second line of the VPI/VCI conversion table 202. The switch unit 65 outputs the cell to the voice processing trunk #1 by using the TAG "c" attached to the cell.

The voice processing trunk #1 again inputs the cell to the switch unit 65 after performing the encoding process for the input cell. First of all, the encoding unit 182 converts the PCM code of the AAL type 1 cell into a particular voice code, and outputs the converted data to the VPI/VCI conversion unit 185 as a PF cell.

The VPI/VCI conversion unit 185 converts the VPI/VCI of the PF cell into those corresponding to the voice processing trunk #2, and attaches a TAG "d" to the cell by referencing the first line of the VPI/VCI conversion table 186. The switch unit 65 outputs the cell to the voice processing trunk #2 by using the TAG "d" attached to the cell.

The AAL2 multiplexing unit 192 within the voice processing trunk #2 converts the input PF cell into an AAL type 2 cell, and outputs the AAL type 2 cell to the VPI/VCI conversion unit 195. The VPI/VCI conversion unit 195 converts the VPI/VCI of the cell into those corresponding to the trunk line at the point B, and attaches a TAG "b" to the cell by referencing the first line of the VPI/VCI/CID conversion table 196. The switch unit 65 outputs the cell to the line unit 66 at the point B by using the TAG "b" attached to the cell.

For the connection in the opposite direction, that is, the data from the ATM network to the STM network, an AAL type 2 cell is input from the trunk line at the point B (the path #3). The VPI/VCI conversion unit 201 within the line unit 66 at the point B converts the VPI/VCI of the input cell into those corresponding to the voice processing trunk #2, and attaches a TAG "d" to the cell by referencing the second line of the VPI/VCI conversion table 203. The switch unit 65 outputs the cell to the voice processing trunk #2 by using the TAG "d" attached to the cell.

The AAL2 demultiplexing unit 193 within the voice processing trunk #2 converts the format of an input cell from the AAL type 2 format to the PF format, and outputs the cell to the VPI/VCI conversion unit 195. The VPI/VCI conversion unit 195 converts the VPI/VCI of the cell into those corresponding to the voice processing trunk #1, and attaches a TAG "c" to the cell by referencing the second line of the VPI/VCI/CID conversion table 196. The switch unit 65 outputs the cell to the voice processing trunk #1 by using the TAG "c" attached to the cell.

The voice processing trunk #1 again inputs the cell to the switch unit 65 after performing the voice decoding process for the input cell. First of all, the decoding unit 183 converts the voice code of the PF cell into a PCM code, and outputs the converted data to the VPI/VCI conversion unit 185 as an AAL type 1 cell.

The VPI/VCI conversion unit 185 converts the VPI/VCI of the cell into those corresponding to the output line at the point A, and attaches a TAG "a" to the cell by referencing the second line of the VPI/VCI conversion table 186. The switch unit 65 outputs the cell to the line unit 66 at the point A by using the TAG "a" attached to the cell.

As described above, the voice processing trunk #1 which performs the voice encoding/decoding processes and the voice processing trunk #2 which performs the AAL type 2 processes are connected to the different ports of the switch unit 65 in the configuration shown in FIG. 21. Accordingly, for the connection using an encoding method different from that of the voice processing trunk #1, a different voice processing trunk having a similar configuration can be used as a replacement of the voice processing trunk #1, along with the voice processing trunk #2.

In FIG. 21, the encoding unit 182 and the decoding unit 183 are connected to the same port of the switch unit 65. However, these units may be arranged in different voice processing trunks 67, which are connected to different ports. Similarly, the AAL2 multiplexing unit 192 and the AAL2 demultiplexing unit 193 may be connected to different ports.

Furthermore, if processing delays of a voice encoder/decoder are large and if an echo compensation is required within an ATM network, either of the configurations shown in FIGS. 5 and 6, and any of the configurations shown in FIGS. 16, 18, and 20 can be combined and used.

Figure 22:
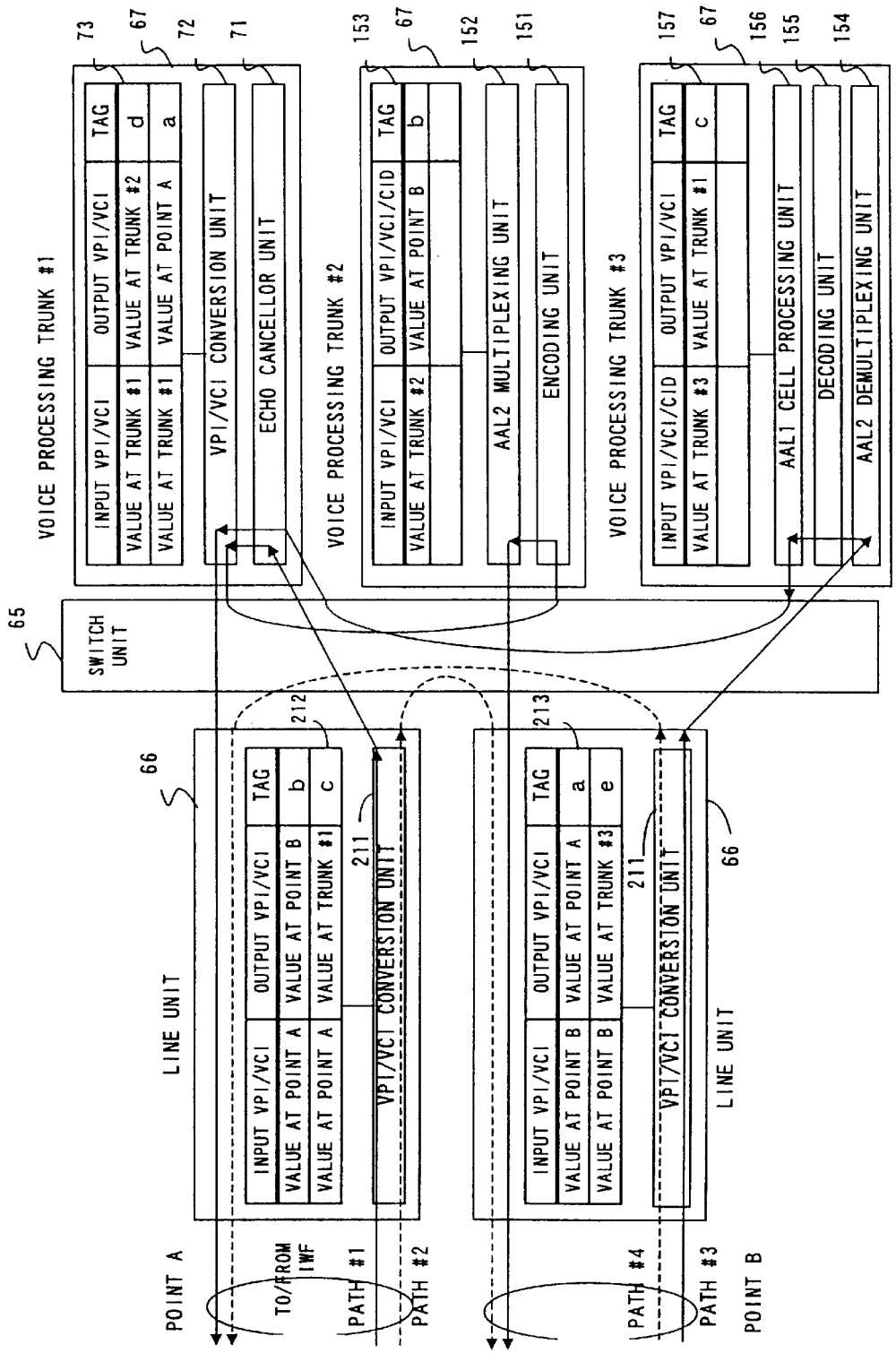
FIG. 22 shows a sixth switching method.

FIG. 22 shows a switching method for use in the ATM switch 61 implemented by combining the configurations shown in FIGS. 5 and 16. 3 voice processing trunks 67 (#1, #2, and #3) are connected to the switch unit 65 shown in FIG. 22. The voice processing trunk #1 corresponds to the voice processing trunk 67 shown in FIG. 5. This trunk includes an echo cancellor unit 71, a VPI/VCI conversion unit 72, and a VPI/VCI conversion table 73.

The voice processing trunk #2 corresponds to the voice processing trunk #1 shown in FIG. 16. This trunk includes an encoding unit 151, an AAL2 multiplexing unit 152, and a VPI/VCI/CID conversion table 153. The voice processing trunk #3 corresponds to the voice processing trunk #2 shown in FIG. 16. This trunk includes an AAL2 demultiplexing unit 154, a decoding unit 155, an AAL1 cell processing unit 156, and a VPI/VCI/CID conversion table 157.

The line unit 66 at the point A includes a VPI/VCI conversion unit 211 and a VPI/VCI conversion table 212, while the line unit 66 at the point B includes a VPI/VCI conversion unit 211 and a VPI/VCI conversion table 213.

In the VPI/VCI conversion tables 73, 212, and 213 and the VPI/VCI/CID conversion tables 153 and 157, TAGs "a", "b", "c", "d", and "e" respectively specify the route to the line unit 66 at the point A, the route to the line unit 66 at the point B, the route to the voice processing trunk #1, the route to the voice processing trunk #2, and the route to the voice processing trunk #3.

The switch unit 65 respectively routes the cell with the TAG "a" attached, the cell with the TAG "b" attached, the cell with the TAG "c" attached, the cell with the TAG "d" attached, and the cell with the TAG "e" attached to the line unit 66 at the point A, the line unit 66 at the point B, the voice processing trunk #1, the voice processing trunk #2, and the voice processing trunk #3.

In FIG. 22, the switching method for use in the case where the connections handled by the ATM switch 61 requires neither the echo cancellor process nor the voice encoding/decoding processes (paths #2 and #4), is similar to that in the case where the connections have small end-to-end transmission delays (the paths #2 and #4) in FIG. 5.

Provided next is the explanation about the case where the connections handled by the ATM switch 61 require the echo cancellor process and the voice encoding/decoding processes. In FIG. 22, paths #1 and #3 correspond to such connections.

STM data from the STM network is converted into an AAL type 1 cell within the IWF 63, and the cell is input from the point A to the ATM switch 61 (the path #1). At this time, the VPI/VCI conversion unit 211 within the line unit 66 at the point A converts the VPI/VCI of the input cell into those corresponding to the voice processing trunk #1, and attaches a TAG "c" to the cell by referencing the second line of the VPI/VCI conversion table 212. The switch unit 65 outputs the cell to the voice processing trunk #1 by using the TAG "c" attached to the cell.

The echo cancellor unit 71 within the voice processing trunk #1 performs the echo cancellor process for the input cell, and outputs the cell to the VPI/VCI conversion unit 72. The VPI/VCI conversion unit 72 converts the VPI/VCI of the input cell into those corresponding to the voice processing trunk #2, and attaches a TAG "d" to the cell by referencing the first line of the VPI/VCI conversion table 73. The VPI/VCI conversion unit 72 then outputs the cell to the switch unit 65, which outputs the cell to the voice processing trunk #2 by using the TAG "d" attached to the cell.

The voice processing trunk #2 again inputs the cell to the switch unit 65 after performing the encoding process for the cell. First of all, the encoding unit 151 converts the PCM code of the AAL type 1 cell into a particular voice code, and outputs the cell to the AAL2 multiplexing unit 152.

The AAL2 multiplexing unit 152 converts the voice code from the encoding unit 151 into an AAL type 2 cell. At this time, the AAL2 multiplexing unit 152 converts the VPI/VCI of the cell into those corresponding to the trunk line at the point B by referencing the first line of the VPI/VCI/CID conversion table 153, and respectively attaches CIDs and a TAG "b" to short cells and the AAL type 2 cell. The switch unit 65 outputs the cell to the line unit 66 at the point B by using the TAG "b" attached to the cell.

For the connection in the opposite direction, that is, the data from the ATM network to the STM network, an AAL type 2 cell is input from the trunk line at the point B (the path #3). The VPI/VCI conversion unit 211 within the line unit 66 at the point B converts the VPI/VCI of the input cell into those corresponding to the voice processing trunk #3, and attaches a TAG "e" to the cell by referencing the second line of the VPI/VCI conversion table 213. The switch unit 65 outputs the cell to the voice processing trunk #3 by using the TAG "e" attached to the cell.

The voice processing trunk #3 again inputs the cell to the switch unit 65 by performing the voice decoding process for the input cell. First of all, the AAL demultiplexing unit 154 demultiplexes data of each connection corresponding to each of the short cells from the AAL type 2 cell, and outputs the data to the decoding unit 155 as a voice code. The decoding unit 155 converts the voice code into a PCM code, and outputs the PCM code to the AAL1 cell processing unit 156.

The AAL1 cell processing unit 156 converts the PCM code from the decoding unit 155 into an AAL type 1 cell. At this time, the AAL1 cell processing unit 156 converts the VPI/VCI of the cell into those corresponding to the voice processing trunk #1, and attaches a TAG "c" to the cell by referencing the first line of the VPI/VCI/CID conversion table 157. The switch unit 56 outputs the cell to the voice processing trunk #1 by using the TAG "c" attached to the cell.

The echo cancellor unit 71 within the voice processing trunk #1 performs the echo cancellor process for the input cell, and outputs the cell to the VPI/VCI conversion unit 72. The VPI/VCI conversion unit 72 converts the VPI/VCI of the cell into those corresponding to the output line at the point A, and attaches a TAG "a" to the cell by referencing the second line of the VPI/VCI conversion table 73. The VPI/VCI conversion unit 72 then outputs the cell to the switch unit 65, which outputs the cell to the line unit 66 at the point A by using the TAG "a" attached to the cell.

In the above described preferred embodiment, the voice processing is performed for the STM data converted into the AAL type 1 cell by the IWF. The voice processing can be also performed for the data from a normal ATM subscriber terminal in a similar manner.

Figure 23:
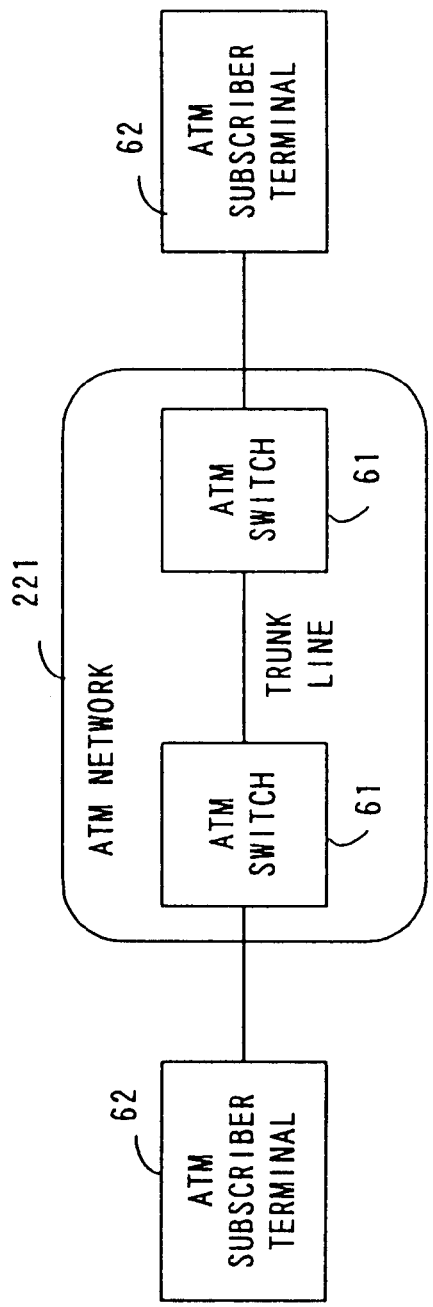
FIG. 23 shows the configuration of an ATM network.

FIG. 23 is a block diagram showing the configuration of an ATM network which does not accommodate an STM network. In this figure, an ATM network 221 includes a plurality of ATM switches 61, to each of which an ATM subscriber terminal 62 is connected.

Figure 24:
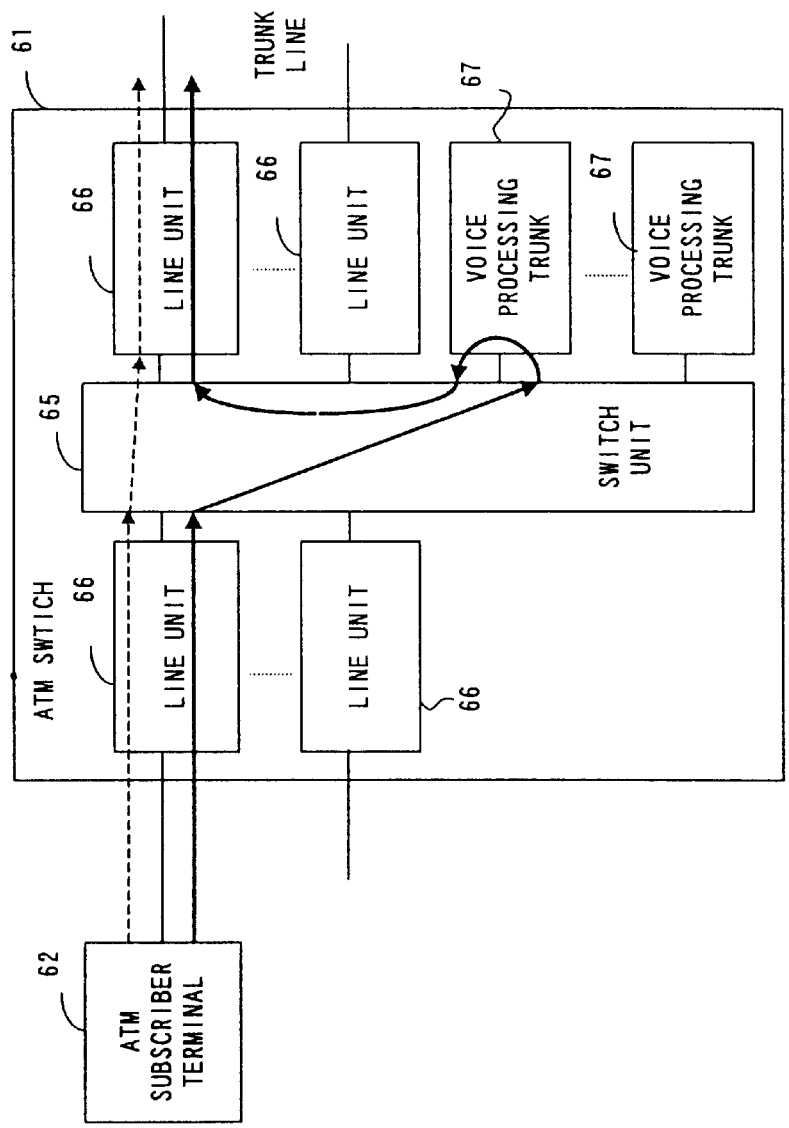
FIG. 24 shows a seventh switching method.

FIG. 24 shows the configuration and the switching method of a communications system within the ATM network 221 shown in FIG. 23. The system shown in FIG. 24 includes an ATM switch 61 and an ATM subscriber terminal. The point that this system does not include an IWF 63 is different from the system shown in FIG. 2B.

When an AAL type 1 cell is input from the subscriber terminal 62 to the ATM switch 61 in FIG. 24, a VPI/VCI conversion is performed in a line unit 66. If the input cell does not require voice processing, the line unit 66 converts the VPI/VCI of the cell into those corresponding to a trunk line, and attaches a TAG to the cell. The switch unit 65 outputs the cell to the line unit 66 of the trunk line by using the TAG attached to the cell, as indicated by a broken line.

If the input cell requires the voice processing, the line unit 66 converts the VPI/VCI of the cell into those corresponding to a voice processing trunk 67, and attaches a TAG to the cell. A switch unit 65 outputs the cell to the voice processing trunk 67 by using the TAG attached to the cell, as indicated by a solid line.

The voice processing trunk 67 again inputs the cell to the switch unit 65 as indicated by a solid line after performing an echo cancellor process, a voice encoding process, AAL type 2 cell processing, etc. for the cell. At this time, the voice processing trunk 67 converts the VPI/VCI of the cell into those corresponding to the trunk line, attaches a TAG to the cell, and inputs the cell to the switch unit 65. The switch unit 65 outputs the cell to the line unit 66 of the trunk line by using the TAG attached to the cell, as indicated by the solid line.

For the connection in the opposite direction, that is, the cell from the trunk line to the subscriber terminal 62, the switching operations are performed with a similar method. In this case, the voice processing trunk 67 performs the echo cancellor process, a voice decoding process, AAL type 2 decell processing, etc., and inputs the cell to the switch unit 65. The switch unit 65 outputs the cell to the line unit 66 of the line of the subscriber terminal 62.

Additionally, the configuration of the switch according to the present invention can be applied not only to voice processing, but also to arbitrary processing such as image processing, etc. Actually, STM data and ATM cells can carry arbitrary digital data including voice and images. The encoding/decoding processes and the AAL type 2 cell/decell processing can be performed for arbitrary data.

In this case, a processing trunk for processing the data of an input cell may be arranged as a replacement of the voice processing trunk 67 shown in FIGS. 2B, 24, etc. This processing trunk has a configuration similar to, for example, that of the voice processing trunk 67 shown in FIG. 16, 18, or 20, and performs the coding/decoding processes or the AAL type 2 cell/decell processing.

According to the present invention, an interwork between an ATM network and an STM network is made more efficient. Especially, voice connections can be efficiently accommodated by the ATM network. To be more specific, the amount of equipment of an IWF can be reduced by limiting the devices to be arranged within the IWF, when various types of data accommodated by the STM network are accommodated by the ATM network. Additionally, an optimum processing trunk can be used according to the attribute of data by incorporating device not arranged within the IWF into an ATM switch as one or more processing trunks, thereby improving the efficiency of data processing.

What is claimed is:

1. A switch for switching communication data, which is partitioned into cells being fixed-length packets, for each of the cells, comprising:

a switch unit determining an output route for each input cell; and a trunk unit performing voice processing of the input cell when the input cell belongs to a particular voice connection, and converting connection identification information of the input cell to connection identification information for connecting said trunk unit via the switch unit to an output line for outputting the input cell.

2. A switch for switching communication data, which is partitioned into cells being fixed-length packets, for each of the cells, comprising:

a switch unit determining an output route for each input cell; and a trunk unit performing voice processing of the input cell when the input cell belongs to a particular voice connection, wherein:

said switch unit accommodates synchronous transfer mode data mapped onto an asynchronous transfer mode adaptation layer type 1 cell; and said trunk unit performs voice processing of the asynchronous transfer mode adaptation layer type 1 cell.

3. The switch according to claim 1, further comprising:

an input line unit performing an interface process between an input line of the input cell and said switch unit; and an output line unit performing an interface process between the output line and said switch unit; wherein said switch unit performs a first switching operation for connecting said input line unit and said output line unit, for a cell of a connection which does not require the voice processing, and performs a second switching operation for connecting said input line unit and said trunk unit and for connecting said trunk unit and said output line unit through said switch unit, for a cell of a connection which requires the voice processing.

4. The switch according to claim 3, wherein said trunk unit includes:

an echo canceller removing an echo of a far end signal superposed on a near end signal, and a conversion unit converting the connection identification information of the input cell to the connection identification information for connecting said trunk unit to the output line; and said switch unit performs the second switching operation for a cell of a voice connection having a large transmission delay, and performs the first switching operation for a cell of other connections.

5. The switch according to claim 3, wherein said trunk unit includes:

an echo canceller removing an echo of a far end signal superposed on a near end signal, and a conversion unit converting the connection identification information of the input cell to connection identification information for connecting said trunk unit to the output line; and said switch unit performs the second switching operation for a cell of the near end signal of a voice connection having a large transmission delay, performs a third switching operation for connecting said input line unit to said output line unit and said trunk unit, for a cell of the far end signal of the voice connection having the large transmission delay, and performs the first switching operation for a cell of other connections.

6. A switch for switching communication data, which is partitioned into cells being fixed-length packets, for each of the cells, comprising:

a switch unit determining an output route for each input cell;

a trunk unit performing voice processing of the input cell when the input cell belongs to a particular voice connection;

an input line unit performing an interface process between an input line of the input cell and said switch unit; and an output line unit performing an interface process between the output line and said switch unit; wherein said switch unit performs a first switching operation for connecting said input line unit and said output line unit, for a cell of a connection which does not require the voice processing, and performs a second switching operation for connecting said input line unit and said trunk unit and for connecting said trunk unit and said output line unit, for a cell of a connection which requires the voice processing; and wherein said trunk unit includes a plurality of voice processors performing the voice processing for each of a plurality of connections; and said input line unit converts connection identification information of the input cell into information which specifies one of the plurality of voice processors.

7. The switch according to claim 6, wherein said trunk unit further includes:

a cell distributor distributing the input cell to a specified voice processor by referencing the connection identification information of the input cell; and a cell multiplexer multiplexing cells from the plurality of voice processors.

8. The switch according to claim 6, wherein said trunk unit further includes a cell multiplexer multiplexing cells from the plurality of voice processors, each of which includes a filter passing a cell having predetermined particular connection identification information.

9. The switch according to claim 6, wherein each of said voice processors includes an output controller outputting a cell for which the voice processing is performed after a predetermined amount of time elapses from an arrival of the input cell.

10. A switch for switching communication data, which is partitioned into cells being fixed-length packets, for each of the cells, comprising:

a switch unit determining an output route for each input cell;

a trunk unit performing voice processing of the input cell when the input cell belongs to a particular voice connection;

an input line unit performing an interface process between an input line of the input cell and said switch unit; and an output line unit performing an interface process between the output line and said switch unit; wherein said switch unit performs a first switching operation for connecting said input line unit and said output line unit, for a cell of a connection which does not require the voice processing, and performs a second switching operation for connecting said input line unit and said trunk unit and for connecting said trunk unit and said output line unit, for a cell of a connection which requires the voice processing; and wherein said trunk unit includes first and second trunk units;

said first trunk unit includes an encoder converting voice data of an asynchronous transfer mode adaptation layer 1 type cell into a particular voice code, and a multiplexer multiplexing voice codes from said encoder into an asynchronous transfer mode adaptation layer type 2 cell;

said second trunk unit including a demultiplexer demultiplexing a voice code of each connection from an asynchronous transfer mode adaptation layer type 2 cell, a decoder converting the voice code from said demultiplexer into voice data, and a cell processor converting the voice data from said decoder into an asynchronous transfer mode adaptation layer type 1 cell; and said switch unit passes the input cell through one of said first and second trunk units by performing the second switching operation for a cell of a particular voice connection, and performs the first switching operation for a cell of other connections.

11. A switch for switching communication data, which is partitioned into cells being fixed-length packets, for each of the cells, comprising:

a switch unit determining an output route for each input cell;

a trunk unit performing voice processing of the input cell when the input cell belongs to a particular voice connection;

an input line unit performing an interface process between an input line of the input cell and said switch unit; and an output line unit performing an interface process between the output line and said switch unit; wherein said switch unit performs a first switching operation for connecting said input line unit and said output line unit, for a cell of a connection which does not require the voice processing, and performs a second switching operation for connecting said input line unit and said trunk unit and for connecting said trunk unit and said output line unit, for a cell of a connection which requires the voice processing; and wherein said trunk unit includes an encoder converting voice data of an asynchronous transfer mode adaptation layer type 1 cell into a particular voice code, a multiplexer multiplexing voice codes from said encoder into an asynchronous transfer mode adaptation layer type 2 cell, a demultiplexer demultiplexing a voice code of each connection from an asynchronous transfer mode adaptation layer type 2 cell, a decoder converting the voice code from said demultiplexer, a cell processor converting the voice data from said decoder into an asynchronous transfer mode adaptation layer type 1 cell, a cell distributor distributing the input cell to one of said encoder and said demulitplexer by referencing connection identification information of the input cell, and a cell multiplexer multiplexing cells from said multiplexer and said cell processor; and said switch unit performs the second switching operation for a cell of a particular voice connection, and performs the first switching operation for a cell of other connections.

12. A switch for switching communication data, which is partitioned into cells being fixed-length packets, for each of the cells, comprising:

a switch unit determining an output route for each input cell;

a trunk unit performing voice processing of the input cell when the input cell belongs to a particular voice connection;

an input line unit performing an interface process between an input line of the input cell and said switch unit; and an output line unit performing an interface process between the output line and said switch unit; wherein said switch unit performs a first switching operation for connecting said input line unit and said output line unit, for a cell of a connection which does not require the voice processing, and performs a second switching operation for connecting said input line unit and said trunk unit and for connecting said trunk unit and said output line unit, for a cell of a connection which requires the voice processing; and wherein said trunk unit includes first and second trunk units;

said first trunk unit includes an encoder converting voice data of an asynchronous transfer mode adaptation layer type 1 cell into a particular voice code and outputting a partially filled cell including the voice code, and a decoder converting the voice code of the partially filled cell into voice data and outputting an asynchronous transfer mode adaptation layer type 1 cell including the voice data;

said second trunk unit includes a multiplexer multiplexing one or more partially filled cells into an asynchronous transfer mode adaptation layer type 2 cell, and a demultiplexer demultiplexing a voice code of each connection from an asynchronous transfer mode adaptation layer type 2 cell and generating one or more partially filled cells; and said switch unit passes the input cell through said first and second trunk units by performing the second switching operation for a cell of a particular voice connection, and for performing the first switching operation for a cell of other connections.

13. A switch for switching communication data, which is partitioned into cells being fixed-length packets, for each of the cells, comprising:

a switch unit determining an output route for each input cell; and a trunk unit performing voice processing of the input cell when the input cell belongs to a particular voice connection;

wherein said trunk unit performs at least one of an echo cancellor process for removing an echo of a far end signal superposed on a near end signal, encoding process for converting voice data of the input cell into a particular voice code, a decoding process for converting a voice code of the input cell into voice data, a multiplexing process for multiplexing data of the input cell into an asynchronous transfer mode adaptation layer type 2 cell, and a demultiplexing process for demultiplexing data from an input asynchronous transfer mode adaptation layer type 2 cell.

14. A switch for switching communication data, which is partitioned into cells being fixed-length packets, for each of the cells, comprising:

a switch unit determining an output route for each input cell; and a trunk unit performing voice processing of the input cell when the input cell belongs to a particular voice connection; wherein said trunk unit includes:

a first trunk unit removing an echo of a far end signal superposed on a near end signal;

a second trunk unit converting voice data of the input cell into a particular voice code; and a third trunk unit converting a voice code of the input cell into voice data.

15. A switch for switching communication data, which is partitioned into cells being fixed-length packets, for each of the cells, comprising:

a switch unit determining an output route for each input cell; and a trunk unit performing voice processing of the input cell when the input cell belongs to a particular voice connection; wherein said trunk unit includes:

a first trunk unit removing an echo of a far end signal superposed on a near end signal;

a second trunk unit multiplexing data of the input cell into an asynchronous transfer mode adaptation layer type 2 cell; and a third trunk unit demultiplexing data from an input asynchronous transfer mode adaptation layer type 2 cell.

16. A voice processing trunk for use in a system which switches communication data, which is partitioned into cells being fixed-length packets, for each of the cells, comprising:

a voice processing unit for performing voice processing for an input cell when the input cell belongs to a particular voice connection; and a conversion unit for converting connection identification information of the input cell to connection identification information for connecting said voice processing trunk via a switch unit to an output line for outputting the input cell.

17. A switch for switching communication data, which is partitioned into cells being fixed-length packets, for each of the cells, comprising:

a switch unit for determining an output route for an input cell; and a trunk unit for processing data of the input cell when the input cell belongs to a particular connection, and converting connection identification information of the input cell to connection identification information for connecting said trunk unit via the switch unit to an output line for outputting the input cell.

18. A switching method for switching communication data, which is partitioned into cells being fixed-length packets, for each of the cells, comprising:

determining a connection of an input cell;

routing the input cell to a voice processing trunk when the input cell belongs to a particular voice connection;

performing voice processing in the voice processing trunk for the input cell which belongs to the particular voice connection; and converting connection identification information of the input cell to connection identification information in the voice processing trunk for routing the input cell to an output line.

19. A switching method for switching communication data, which is partitioned into cells being fixed-length packets, for each of the cells, comprising:

determining a connection of an input cell;

routing the input cell to a particular trunk unit when the input cell belongs to a particular connection;

processing data of the input cell which belongs to the particular connection in the particular trunk unit; and converting connection identification information of the input cell to connection identification information in the particular trunk unit for routing the input cell to an output line.

20. A communications system for switching communication data, which is partitioned into cells being fixed-length packets, for each of the cells, comprising:

a switch unit routing an input cell according to connection identification information thereof; and a trunk unit performing voice processing of the input cell when the input cell belongs to a particular connection, and converting connection identification information of the input cell to connection identification information for connecting said trunk unit via the switch unit to an output line for outputting the input cell.

21. A communications system for switching communication data, which is partitioned into cells being fixed-length packets, for each of the cells, comprising:

a switch unit routing an input cell according to connection identification information thereof; and a trunk unit performing voice processing of the input cell when the input cell belongs to a particular connection, wherein:

said switch unit accommodates synchronous transfer mode data mapped onto an asynchronous transfer mode adaptation layer type 1 cell; and said trunk unit performs voice processing of the asynchronous transfer mode adaptation layer type 1 cell.

22. A trunk for use in a communication system which switches communication data, which is partitioned into cells being fixed-length packets, for each of the cells, comprising:

a processing unit for performing voice processing for an input cell when the input cell belongs to a particular connection; and a conversion unit for converting connection identification information of the input cell to connection identification information for connecting said voice processing trunk via a switch unit to an output line for outputting the input cell.

23. A communications system for switching communication data, which is partitioned into cells being fixed-length packets, for each of the cells, comprising:

a switch unit for routing an input cell according to connection identification information thereof; and a trunk unit for processing data of the input cell when the input cell belongs to a particular connection, and converting connection identification information of the input cell to connection identification information for connecting said trunk unit via the switch unit to an output line for outputting the input cell.

* * * * *